United States Patent
Shitama

(10) Patent No.: US 7,257,104 B2
(45) Date of Patent: Aug. 14, 2007

(54) COMMUNICATION PROCESSING SYSTEM, COMMUNICATION PROCESSING METHOD, COMMUNICATION TERMINAL DEVICE, AND PROGRAM

(75) Inventor: Kazuhiro Shitama, Chiba (JP)

(73) Assignee: Sony Corporation, Tokyo (JP)

( * ) Notice: Subject to any disclaimer, the term of this patent is extended or adjusted under 35 U.S.C. 154(b) by 1155 days.

(21) Appl. No.: 10/085,284

(22) Filed: Feb. 28, 2002

(65) Prior Publication Data
US 2002/0126642 A1 Sep. 12, 2002

(30) Foreign Application Priority Data
Mar. 5, 2001 (JP) ............................ P2001-059568

(51) Int. Cl.
*H04Q 7/24* (2006.01)
(52) U.S. Cl. ...................................... 370/338; 370/349
(58) Field of Classification Search ...................... None
See application file for complete search history.

(56) References Cited

U.S. PATENT DOCUMENTS

| | | | |
|---|---|---|---|
| 6,058,431 A * | 5/2000 | Srisuresh et al. ............ 709/245 |
| 6,515,974 B1 * | 2/2003 | Inoue et al. ................. 370/331 |
| 6,708,219 B1 * | 3/2004 | Borella et al. .............. 709/245 |
| 6,751,672 B1 * | 6/2004 | Khalil et al. ................ 709/230 |
| 6,973,506 B2 * | 12/2005 | Ishiyama et al. ........... 709/245 |
| 2003/0016655 A1 * | 1/2003 | Gwon ........................ 370/352 |

* cited by examiner

*Primary Examiner*—Huy D. Vu
*Assistant Examiner*—Rhonda Murphy
(74) *Attorney, Agent, or Firm*—Sonnenschein Nath & Rosenthal LLP

(57) ABSTRACT

In a communication system for a mobile node according to IPv6, a virtual network prefix is configured as a prefix specific to a mobile node in a domain having a plurality of subnetworks. In the domain, a packet is sent to the mobile node by host-based routing on an IPv6 address formed of the virtual network prefix and an interface ID. The communications process with the mobile node which cannot identify a virtual network prefix is performed using a physical network prefix according to IPv6. Accordingly, nodes which can and cannot identify a virtual network prefix can coexist in the domain.

27 Claims, 23 Drawing Sheets

FIG. 8
Prior Art

| HOST NAME | HOME ADDRESS |
|:---:|:---:|
| aaaa | XXXX |
| bbbb | YYYY |
| cccc | ZZZZ |
| ⋮ | ⋮ |

FIG. 9
Prior Art

| SOURCE: ADDRESS OF TERMINAL DEVICE 3<br>DESTINATION: HOME ADDRESS OF TERMINAL DEVICE 1 |
|:---|
| DATA |

FIG. 10
Prior Art

| SOURCE : ADDRESS OF HOME AGENT 2<br>DESTINATION : CARE-OF ADDRESS OF TERMINAL DEVICE 1 |
|---|
| SOURCE : ADDRESS OF TERMINAL DEVICE 3<br>DESTINATION : HOME ADDRESS OF TERMINAL DEVICE 1 |
| DATA |

FIG. 11
Prior Art

| SOURCE : CARE-OF ADDRESS OF TERMINAL DEVICE 1<br>DESTINATION : ADDRESS OF TERMINAL DEVICE 3 |
|---|
| <DESTINATION HEADER><br>HOME ADDRESS OF TERMINAL DEVICE 1 |
| DATA |

FIG. 12
Prior Art

| SOURCE : ADDRESS OF TERMINAL DEVICE 3<br>DESTINATION : CARE-OF ADDRESS OF TERMINAL DEVICE 1 |
|---|
| <ROUTING HEADER><br>HOME ADDRESS OF TERMINAL DEVICE 1 |
| DATA |

FIG. 14
Prior Art

| |
|---|
| SOURCE : CARE-OF ADDRESS OF TERMINAL DEVICE 1<br>DESTINATION : ADDRESS OF TERMINAL DEVICE 3 |
| \<SOURCE HEADER\><br>HOME ADDRESS OF TERMINAL DEVICE 1 |
| \<SOURCE HEADER\><br>UPDATE |
| \<AUTHENTICATION HEADER\> |

FIG. 15
Prior Art

| SOURCE : CARE-OF ADDRESS OF TERMINAL DEVICE 1<br>DESTINATION : ADDRESS OF HOME AGENT |
|---|
| \<SOURCE HEADER\><br>HOME ADDRESS OF TERMINAL DEVICE 1 |
| \<SOURCE HEADER\><br>UPDATE |
| \<AUTHENTICATION HEADER\> |

COMMUNICATION PROCESSING SYSTEM, COMMUNICATION PROCESSING METHOD, COMMUNICATION TERMINAL DEVICE, AND PROGRAM

RELATED APPLICATION DATA

The present application claims priority to Japanese Application(s) No(s). P2001-059568 filed Mar. 5, 2001, which application(s) is/are incorporated herein by reference to the extent permitted by law.

BACKGROUND OF THE INVENTION

1. Field of the Invention

The present invention relates to a communication processing system, a communication processing method, a communication terminal device, and a program. More particularly, the present invention relates to a communication processing system, a communication processing method, a communication terminal device, and a program, whereby improved addressing and communication processing for a mobile communication device are achieved.

2. Description of the Related Art

In recent years, as the popularity of portable personal computers or cellular phones has increased, most users carry such portable devices having communication and information processing capabilities, and connect to a network in the field or on the road to communicate via the network.

In such a so-called mobile computing environment, devices such as personal computers which access a network for servicing are mobile nodes. Desirably, the mobile nodes maintain continuous communicatability even if the node points change.

The communication protocol used in the Internet is known as IP (Internet Protocol). Currently, IPv4 (Internet Protocol version 4) is often used as the IP, which uses addresses (IP addresses) of 32 bits for sources and destinations. In Internet communications, global IP addressing by which a 32-bit IP address is uniquely allocated to each source and destination is used to determine the individual sources and destinations based on the IP addresses. However, as the Internet world has dramatically become widespread, IPv4 has experienced the problem of limited the address space, or exhausting global addresses. In order to solve such a problem, IPv6 (Internet Protocol version 6) in which the IP address space is extended from 32 bits to 128 bits has been newly proposed by the IETF (Internet Engineering Task Force) as a next-generation IP address protocol.

Communication protocols for nodes in a mobile computing environment include Mobile IPv6 proposed by the IETF (Internet Engineering Task Force) and LIN6 suggested by Sony Corporation.

In Mobile IPv6, a node has two IP addresses: a home address and a care-of address. The care-of address may change depending upon a subnetwork to which the node is connected as the node moves. The home address is fixed even if the node moves. A correspondent node can specify the home address of a mobile node to communicate with the mobile node wherever the mobile node is positioned, or wherever the subnetwork to which the mobile node is connected is positioned.

In Mobile IPv6, the processing by a home agent makes it possible to communicate with a mobile node. The home agent is a node connected to a subnetwork corresponding to the home address of a mobile node. When a communicating node moves, the home agent receives a binding update packet containing a new care-of address from this mobile node to update a binding cache which stores the correlation between the home address (fixed) and the care-of address (variable). The home agent further informs the network of routing information for the home address of the mobile node.

FIG. 1 is a diagram which illustrates the care-of address registration process. When a terminal device 1 or a node moves, the terminal device 1 obtains a care-of address from a subnetwork at the point to which it moved. The terminal device (mobile node) 1 generates a binding update packet containing the home address, the care-of address, and authentication data of the terminal device 1, and sends them to a home agent 2.

FIG. 2 is a diagram of the format of an IPv6 header of an IPv6 packet. As shown in FIG. 2, the IPv6 packet includes a 4-bit protocol version, an 8-bit traffic class for recognizing and determining priority, and a 20-bit flow label for identifying a packet that requests execution of a special operation using a router that functions as a communication relay unit. The IPv6 packet further includes a source address that is the address of a packet sender node, a destination address that is the address of a packet receiver node, and an optional extension header.

FIG. 3 is a diagram of the format of an IPv6 address. The upper 64 bits of the IPv6 address represent routing information, and the lower 64 bits thereof represent an interface identifier used to identify the network interface possessed by the node in a subnetwork to which the node is connected. The interface identifier is unique in a subnetwork, and is implemented by a MAC (Media Access Control) address or the like.

FIG. 4 is a diagram which illustrates a typical binding update packet, that is, a packet for transmitting mobile node information from a mobile node to a home agent. At the IPv6 header, the care-of address of the terminal device 1 is assigned to the source address, and the address of the home agent 2 is assigned to the destination address.

The extension header contains the home address of the terminal device 1 as the source header, data indicating that this packet requests the updating process, and an authentication header.

FIG. 5 is a diagram of the authentication header. The authentication header contains an SPI (Security Parameters Index), a sequence number, and authentication data. As shown in FIG. 6, the home agent 2 identifies an SA (Security Association) based on the source address and the SPI of the authentication header to determine an authentication key, an encryption method, and the like.

When the home agent 2 receives a binding update packet, it determines whether the authentication data is correct or not. If it is determined that the authentication data is correct, the care-of address contained in the received binding update packet is registered in the binding cache of the home agent 2. The home agent 2 then updates the binding cache of the home agent 2, and transmits a response packet to the terminal device 1.

A description as to how a typical terminal device 3 sends a packet to a mobile terminal device 1 is made with reference to FIG. 7. The terminal device 3 queries a domain name server 4 as to the home address of the terminal device 1 while presenting the host name of the terminal device 1. The domain name server 4 which stores the correlation shown in FIG. 8 between the host name and the home address searches for the home address of the terminal device 1 which is associated with the host name, and sends it as a response to the terminal device 3. The terminal device 3 generates and sends a packet shown in FIG. 9 in which the home address of the terminal device 1 is assigned to the source address.

The packet sent by the terminal device 3 reaches the home agent 2 according to the routing information that the home agent 2 announces to the network. The home agent 2 further adds an IPv6 header at which the care-of address of the terminal device 1 is assigned to the destination address to the received packet, and delivers the resulting packet shown in FIG. 10. This packet reaches the terminal device 1 according to a common routing mechanism. The terminal device 1 removes the IPv6 header that was added by the home agent 2 from the received packet to obtain the original packet.

The terminal device 1 generates a binding update packet containing an authentication header and the care-of address of the terminal device 1, and delivers it to the terminal device 3 to notify the terminal device 3 about the care-of address of the terminal device 1. When the terminal device 3 receives the binding update packet, it verifies the authenticity of the authentication data. If the terminal device 3 determines that the authentication data is correct, it registers the care-of address of the terminal device 1 in the binding cache. After registration, the terminal device 3 transmits an acknowledgement response packet to the terminal device 1.

The packet which is sent from the terminal device 1 to the terminal device 3 contains the care-of address of the terminal device 1 as the source address, and the home address thereof stored in a destination options header of the extension header, as shown in FIG. 11. This packet is passed to the terminal device 3 through the optimal route.

A routing header is added to the packet that is sent by the terminal device 3 to the terminal device 1 after the terminal device 3 has received the binding update packet, as shown in FIG. 12. The resulting packet is passed to the terminal device 1 through the optimal route.

In this state, as the terminal device 1 moves, the terminal device 1 sends a new care-of address to both the terminal device 3 and the home agent 2. Upon receiving the new care-of address, the terminal device 3 holds the correlation between the home address and the care-of address of the terminal device 1 in a binding cache in a manner similar to the home agent 2. The terminal device 1 sends a binding update packet to both the home agent 2 and the terminal device 3 at regular intervals, thereby causing the terminal device 3 to update the binding cache.

The operation performed when the terminal device 1 moves is described with reference to FIG. 13. The terminal device 1 obtains a care-of address from a subnetwork at the point to which it moved. The terminal device 1 generates a binding update packet shown in FIG. 14 which contains the home address of the terminal device 1 and the like, and sends it to the terminal device 3. Upon receiving the binding update packet, the terminal device 3 verifies the authenticity of the authentication data stored in the binding update packet. If it determines that the authentication data is correct, the terminal device 3 registers the care-of address of the terminal device 1 which is contained in the binding update packet in the binding cache. After registration, the terminal device 3 transmits an acknowledgement response packet to the terminal device 1.

The terminal device 1 generates a binding update packet shown in FIG. 15 which contains the home address of the terminal device 1 and the like, and sends it to the home agent 2. Upon receiving the binding update packet, the home agent 2 determines whether the authentication data stored in the binding update packet is correct or not. If it determines that the authentication data is correct, the home agent 2 registers the care-of address of the terminal device 1 which is contained in the binding update packet in the binding cache. After registration, the home agent 2 transmits an acknowledgement response packet to the terminal device 1.

As described above, in Mobile IPv6 proposed by the IETF (Internet Engineering Task Force) which is known as a communication protocol for nodes in a mobile computing environment, a node must send a binding update packet at regular intervals or at least each time the node moves from one subnetwork to another in order to notify a server (in Mobile IPv6, a home agent) which manages the position information of that node and a correspondent terminal device that the node point has changed, thus leading to the following problems. If a node moves frequently, a great number of mobile information messages are generated, increasing the network load. If a server which manages the position information is far from a mobile node over a network, it will take much time from when a node moves until the server updates the position information.

Some techniques to solve the above-noted problems are presently proposed by the IETF. These techniques are called micromobility protocols, while the Mobile IPv6 protocol is called a macromobility protocol. However, the proposed protocols are very inefficient in header size or header processing. Furthermore, because the approach used in IPv4 is still applied to IPv6, the features of the address structure (network prefix plus interface ID) of the IPv6 address does not fully work. The network prefix means an address indicating the routing information of the upper 64 bits other than the interface ID of the lower 64 bits of the IPv6 address.

SUMMARY OF THE INVENTION

In view of the foregoing problems, it is an object of the present invention to provide an improved communication processing system, communication processing method, communication terminal device, and program, which fully take advantage of the features of the address structure (which comprises a network prefix and an interface ID) of an IPv6 address, thereby eliminating the position change notification process which is required in Mobile IPv6, etc., each time a node moves from one subnetwork to another, reducing the network load, and, if a server which manages the position information is far from a mobile node over a network, preventing communications delay due to movement of the mobile node.

To this end, in a first aspect of the present invention, a communication processing system including a mobile node, which is a mobile communication terminal device, is provided. In a domain including at least one subnetwork, each subnetwork being associated with a physical network prefix, a virtual network prefix for the mobile node is determined as a network prefix that is different from the physical network prefix, an address is configured based on the virtual network prefix and an identifier of the mobile node, and the communications process with the mobile node is performed according to the address.

Preferably, the identifier of the mobile node is a unique identifier in the domain for identifying the mobile node.

Preferably, the identifier of the mobile node is a unique interface ID in the domain for identifying the mobile node.

In a preferred embodiment of the communication processing system according to the present invention, a router in the domain may forward a router advertisement as an information notification message containing information on the physical network prefix and the virtual network prefix.

In a preferred embodiment of the communication processing system according to the present invention, a router in the domain may route a packet having the address which contains the virtual network prefix by performing host-based routing based on the identifier of the mobile node which is contained in the address.

In a preferred embodiment of the communication processing system according to the present invention, a router in the domain may route a packet having an address which contains a physical network prefix by performing prefix-based routing based on the physical network prefix contained in the address, or by performing host-based routing based on the identifier of the mobile node.

In a preferred embodiment of the communication processing system according to the present invention, when the mobile node moves between a first subnetwork to a second subnetwork in the domain or in different domains, the mobile node may compare the value of the virtual network prefix which is contained in a router advertisement serving as an information notification message which is received from a router on the second subnetwork, with the value of the virtual or physical network prefix which is contained in the address which is used in the first subnetwork. Only if the values are different, the mobile node may create an address based on the virtual network prefix which is contained in the received router advertisement serving as an information notification message.

In a preferred embodiment of the communication processing system according to the present invention, when the mobile node moves from a first subnetwork to a second subnetwork in the domain or in different domains, if the virtual network prefix is not contained in a router advertisement serving as an information notification message which is received from a router on the second subnetwork, the mobile node may create an address based on the physical network prefix.

In a preferred embodiment of the communication processing system according to the present invention, when the mobile node moves between subnetworks in the domain or in different domains, the mobile node may send a routing update message to a router in the domain. The router which has received the routing update message may generate, update, or delete an entry for the mobile node in a routing table according to the received message.

In a preferred embodiment of the communication processing system according to the present invention, when the mobile node moves between subnetworks in different domains, the mobile node may store a virtual-network-prefix-based IPv6 address as a care-of address in a binding update packet, the virtual-network-prefix-based IPv6 address being created according to address configuration based on the virtual network prefix, and may send the binding update packet to a home agent which manages the mobile node. The home agent which has received the binding update packet may update a binding cache, in which the correlation between a home address and the virtual-network-prefix-based IPv6 address as a care-of address is stored, according to the received binding update packet.

In a preferred embodiment of the communication processing system according to the present invention, a plurality of domains may be networked in a hierarchical manner, each domain including the at least one subnetwork.

In a second aspect of the present invention, a communication processing method is provided. The method includes the steps of: in a domain including at least one subnetwork, each subnetwork being associated with a physical network prefix, determining a virtual network prefix for a mobile node that is a mobile communication terminal device as a network prefix that is different from the physical network prefix; configuring an address based on the virtual network prefix and an identifier of the mobile node; and communicating with the mobile node according to the address.

Preferably, the identifier of the mobile node is a unique identifier in the domain for identifying the mobile node.

Preferably, the identifier of the mobile node is a unique interface ID in the domain for identifying the mobile node.

In a preferred embodiment of the communication processing method according to the present invention, a router in the domain may forward a router advertisement as an information notification message containing information on the physical network prefix and the virtual network prefix.

In a preferred embodiment of the communication processing method according to the present invention, a router in the domain may route a packet having the address which contains the virtual network prefix by performing host-based routing based on the identifier of the mobile node which is contained in the address.

In a preferred embodiment of the communication processing method according to the present invention, a router in the domain may route a packet having an address which contains a physical network prefix by performing prefix-based routing based on the physical network prefix contained in the address, or by performing host-based routing based on the identifier of the mobile node.

In a preferred embodiment of the communication processing method according to the present invention, when the mobile node moves between a first subnetwork to a second subnetwork in the domain or in different domains, the mobile node may compare the value of the virtual network prefix which is contained in a router advertisement serving as an information notification message which is received from a router on the second subnetwork, with the value of the virtual or physical network prefix contained in the address which is used in the first subnetwork. Only if the values are different, the mobile node may create an address based on the virtual network prefix which is contained in the received router advertisement serving as an information notification message.

In a preferred embodiment of the communication processing method according to the present invention, when the mobile node moves between a first subnetwork to a second subnetwork in the domain or in different domains, if the virtual network prefix is not contained in a router advertisement serving as an information notification message which is received from a router on the second subnetwork, the mobile node may create an address based on the physical network prefix.

In a preferred embodiment of the communication processing method according to the present invention, when the mobile node moves between subnetworks in the domain or in different domains, the mobile node may send a routing update message to a router in the domain. The router which has received the routing update message may generate, update, or delete an entry for the mobile node in a routing table according to the received message.

In a preferred embodiment of the communication processing method according to the present invention, when the mobile node moves between subnetworks in different domains, the mobile node may store a virtual-network-prefix-based IPv6 address as a care-of address in a binding update packet, the virtual-network-prefix-based IPv6 address being created according to address configuration based on the virtual network prefix, and may send the binding update packet to a home agent which manages the mobile node. The home agent which has received the binding update packet may update a binding cache, in which the correlation between a home address and the virtual-network-prefix-based IPv6 address is stored, according to the received binding update packet.

In a third aspect of the present invention, a communication terminal device which performs communications via a network is provided. The communication terminal device receives a router advertisement serving as an information notification message containing a physical network prefix and a virtual network prefix for a mobile node, the physical network prefix being allocated to each of at least one subnetwork included in a domain. The communication terminal device further configures an address based on the virtual network prefix retrieved from the received router advertisement serving as an information notification message and an identifier of the communication terminal device.

In a preferred embodiment of the communication terminal device according to the present invention, when the communication terminal device moves from a first subnetwork to a second subnetwork in the domain or in different domains, the communication terminal device may compare the value of the virtual network prefix which is contained in a router advertisement serving as an information notification message which is received from a router on the second subnetwork, with the value of the virtual or physical network prefix which is contained in the address which is used in the first subnetwork. Only if the values are different, the communication terminal device may create an address based on the virtual or physical network prefix which is contained in the received router advertisement serving as an information notification message.

In a preferred embodiment of the communication terminal device according to the present invention, when the communication terminal device moves from a first subnetwork to a second subnetwork in the domain or in different domains, if the virtual network prefix is not contained in a router advertisement which is received from a router on the second subnetwork, the communication terminal device may create an address based on the physical network prefix.

In a preferred embodiment of the communication terminal device according to the present invention, when the communication terminal device moves subnetworks in the domain or in different domains, the communication terminal device may send a routing update message to a router in the domain.

In a preferred embodiment of the communication terminal device according to the present invention, when the communication terminal device moves between subnetworks in different domains, the communication terminal device may store a virtual-network-prefix-based IPv6 address as a care-of address in a binding update packet, the virtual-network-prefix-based IPv6 address being created according to address configuration based on the virtual network prefix, and may send the binding update packet to a home agent which manages the communication terminal device.

In a fourth aspect of the present invention, a program which causes a communications process via a network to be executed on a computer system is provided. The program implements the steps of: receiving a router advertisement serving as an information notification message containing a physical network prefix and a virtual network prefix for a mobile node, the physical network prefix being allocated to each of at least one subnetwork included in a domain; and configuring an address based on the virtual network prefix retrieved from the received router advertisement serving as an information notification message and an identifier of a communication terminal device.

The program according to the present invention may be a computer program which is supplied by a recording medium or a communication medium to a general-purpose computer system which allows various program code to be executed in the computer-readable format.

Such a program provided in the computer-readable format enables processing to be achieved on the computer system according to the program. By installing a computer program on a computer system, the cooperative effects are exploited on the computer system, thereby achieving the same advantages as those of the other aspects of the present invention.

The above and other objects, features, and advantages of the present invention will become apparent, taken in conjunction with the following more detailed description of the preferred embodiments of the present invention with reference to the accompanying drawings.

BRIEF DESCRIPTION OF THE DRAWINGS

FIG. 8 is a table indicating the correlation between the host name and home address which is stored in a domain name server;

FIG. 9 is a diagram of the structure of a packet sent by a terminal device;

FIG. 10 is a diagram which illustrates a packet sent by a home agent;

FIG. 11 is a diagram of the structure of a packet sent by a terminal device;

FIG. 12 is a diagram of a routing header added to the packet sent by the terminal device;

FIG. 14 is a diagram of the structure of a binding update packet;

FIG. 15 is a diagram of the structure of a binding update packet;

DESCRIPTION OF THE PREFERRED EMBODIMENTS

Figure 1:
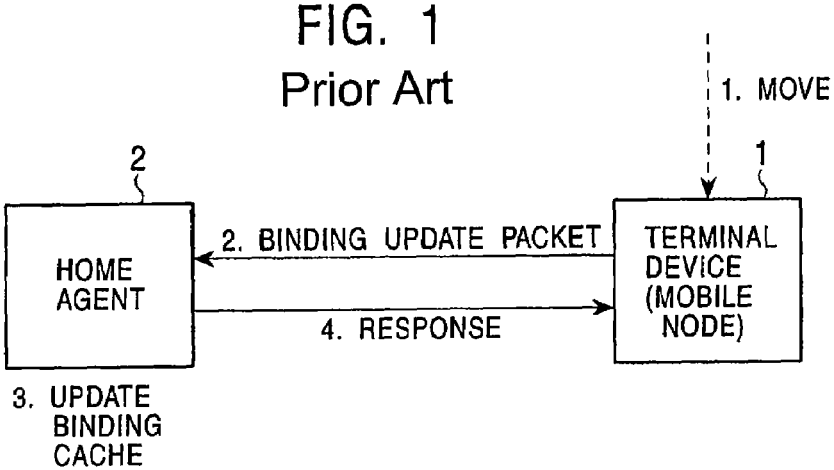
FIG. 1 is a diagram which illustrates the care-of address registration process.
Figure 2:
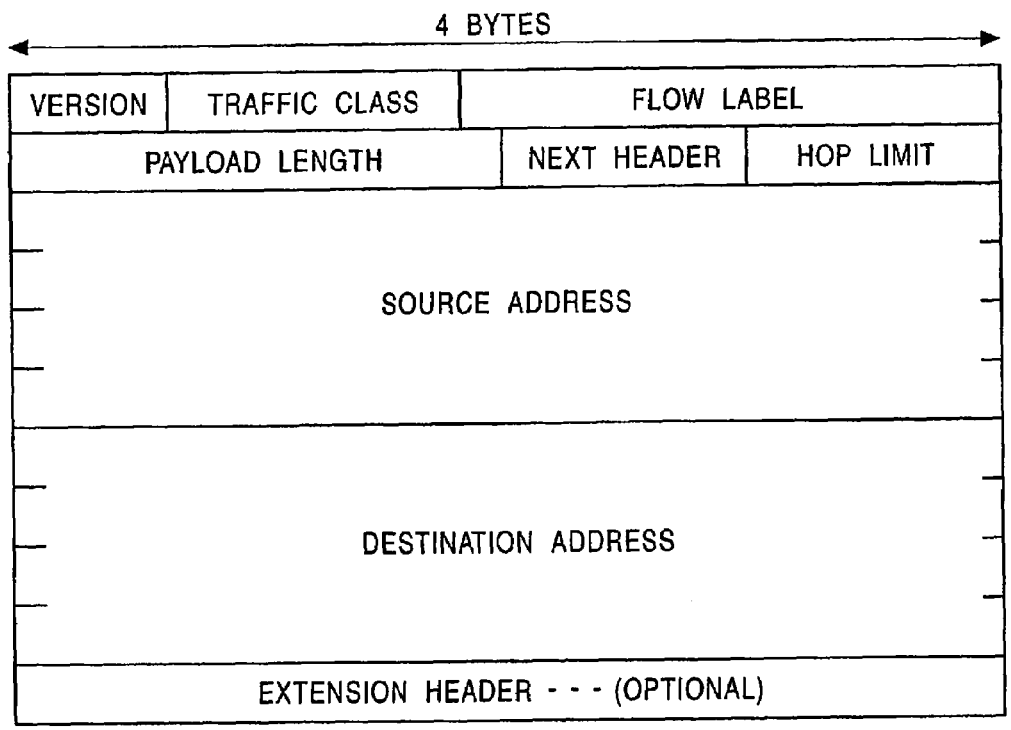
FIG. 2 is a diagram of the format of an IPv6 header.
Figure 3:
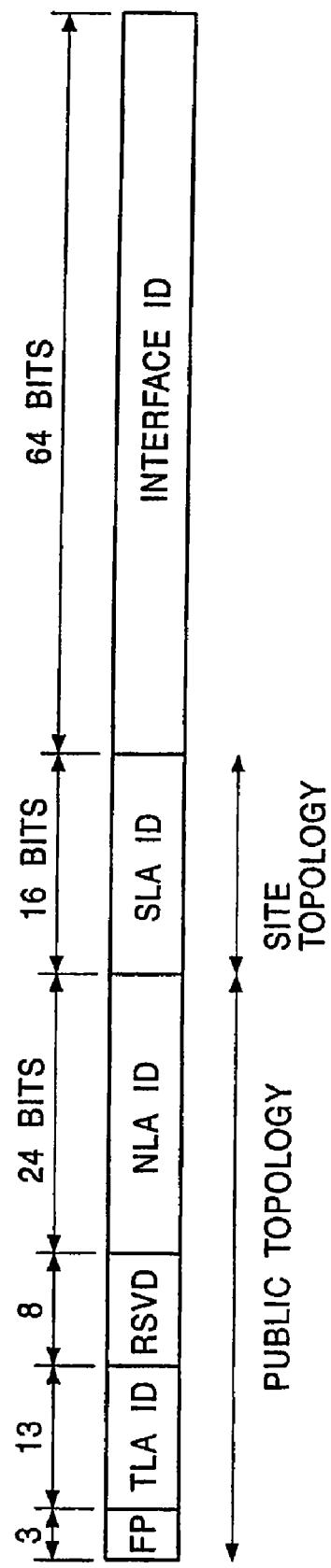
FIG. 3 is a diagram of the format of an IPv6 address.
Figure 4:
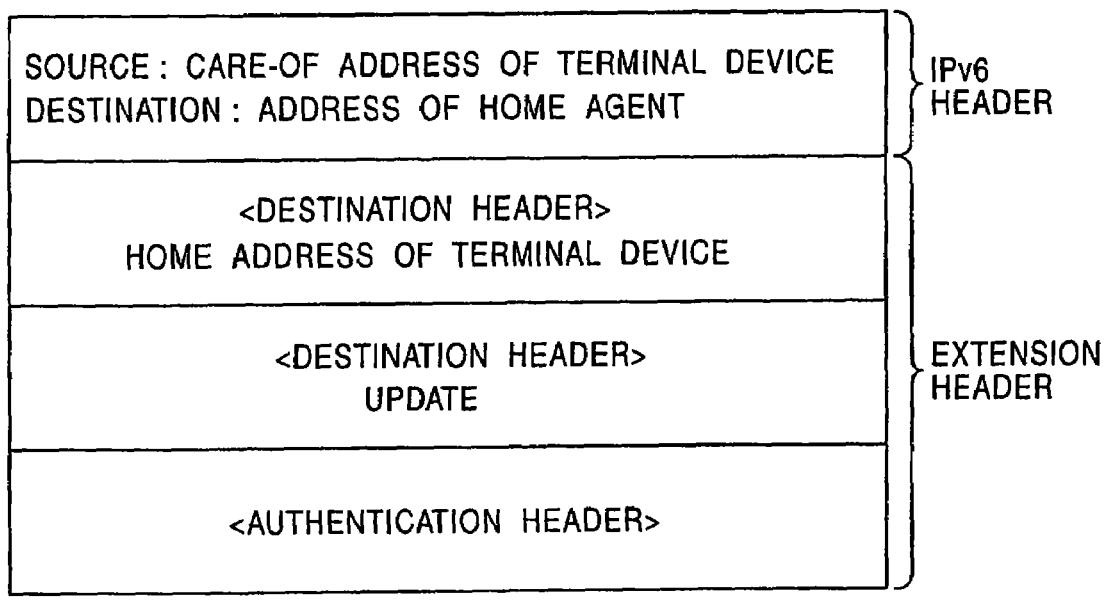
FIG. 4 is a diagram which illustrates a typical binding update packet.
Figure 5:
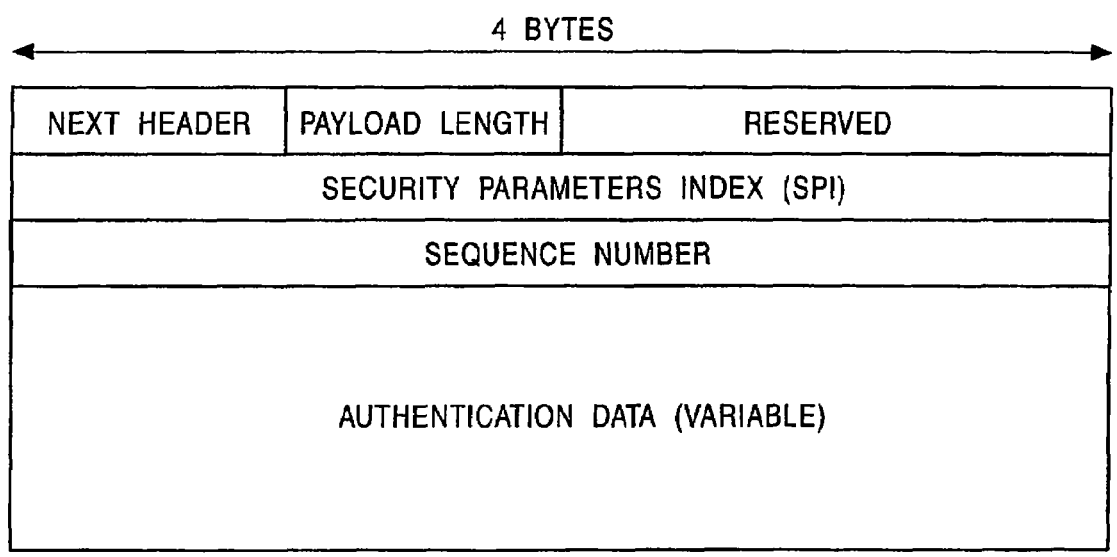
FIG. 5 is a diagram of an authentication header.
Figure 6:
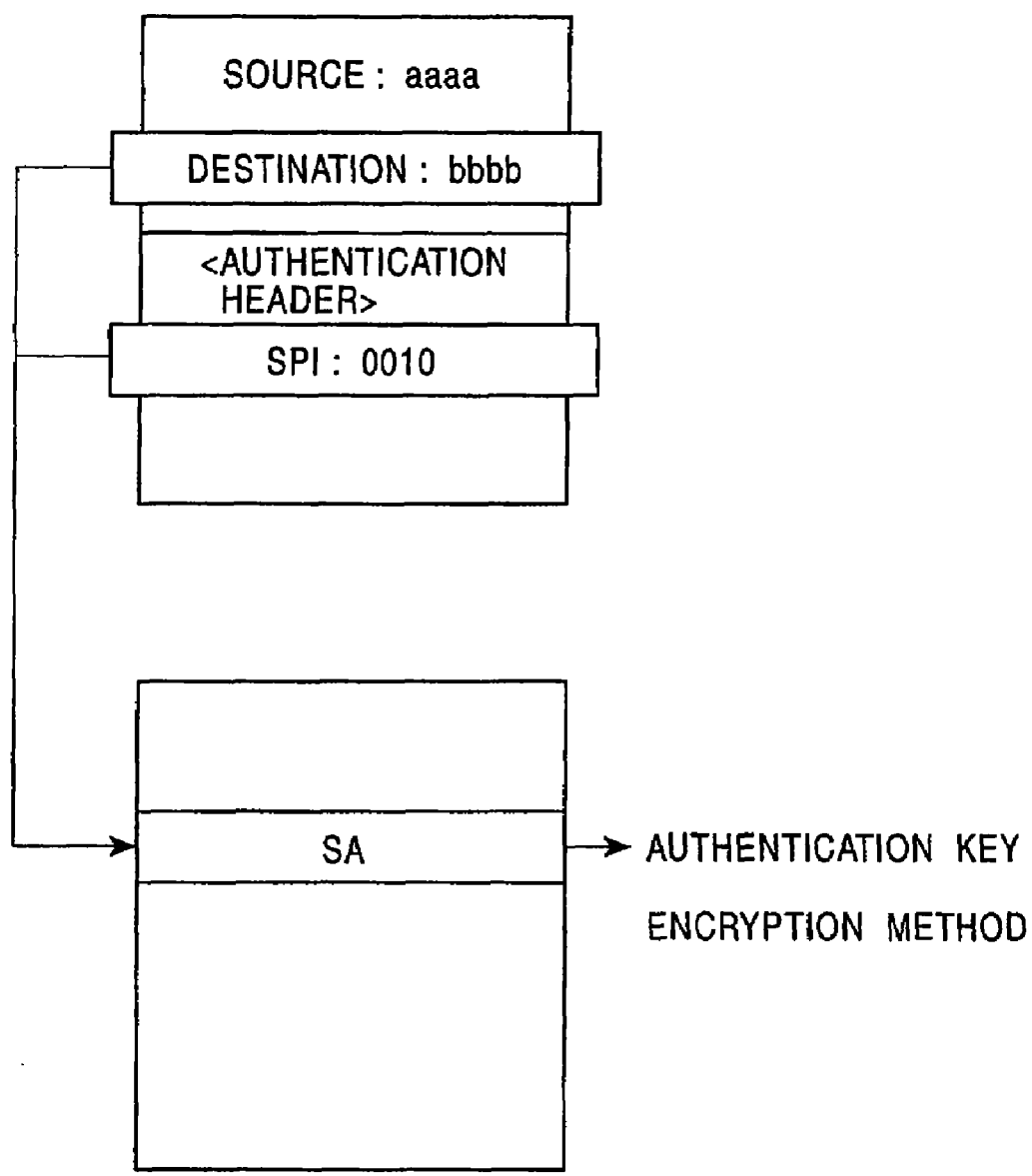
FIG. 6 is a diagram which schematically illustrates the authentication process.
Figure 7:
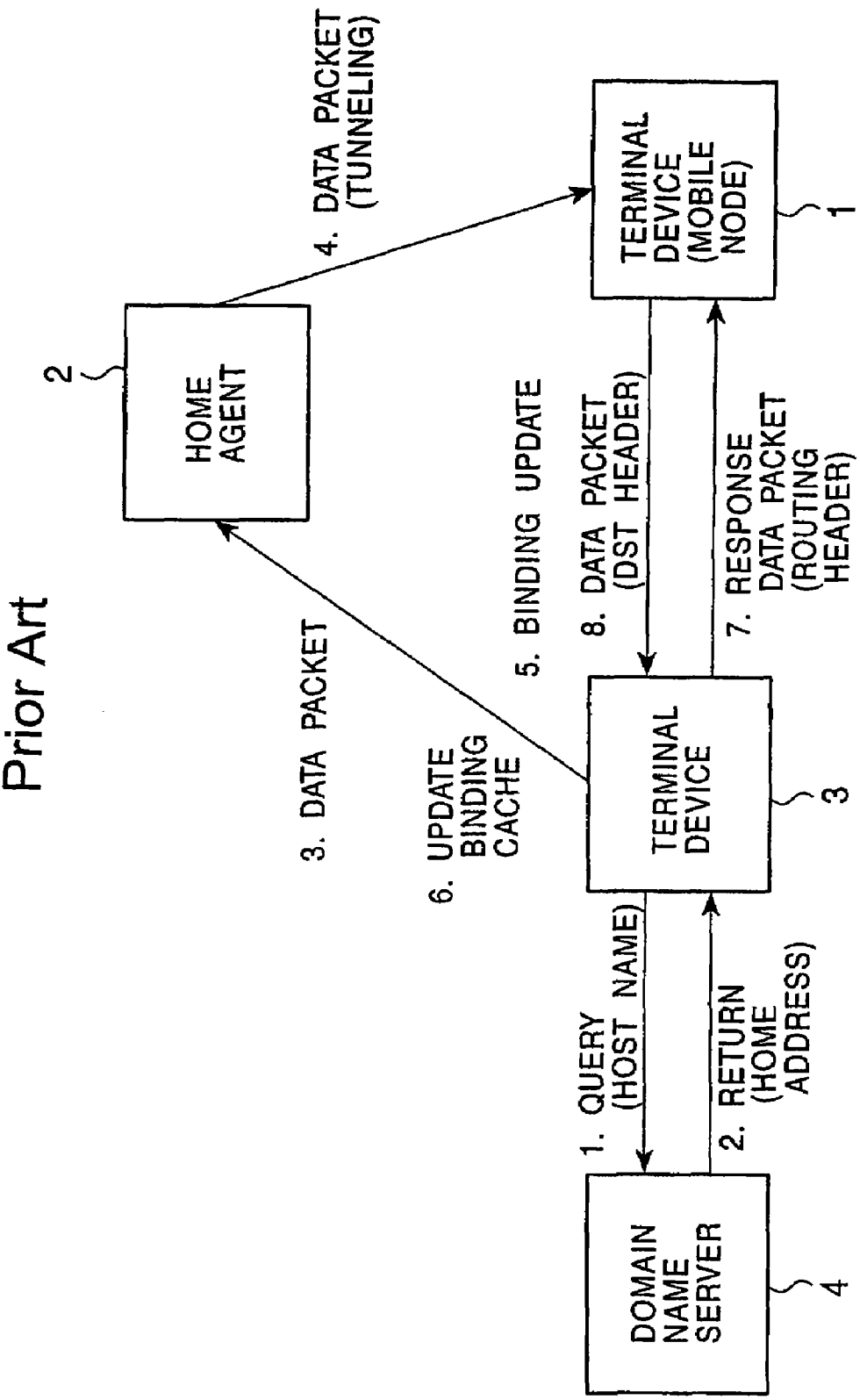
FIG. 7 is a diagram which illustrates how a typical terminal device sends a packet to a mobile terminal device.
Figure 13:
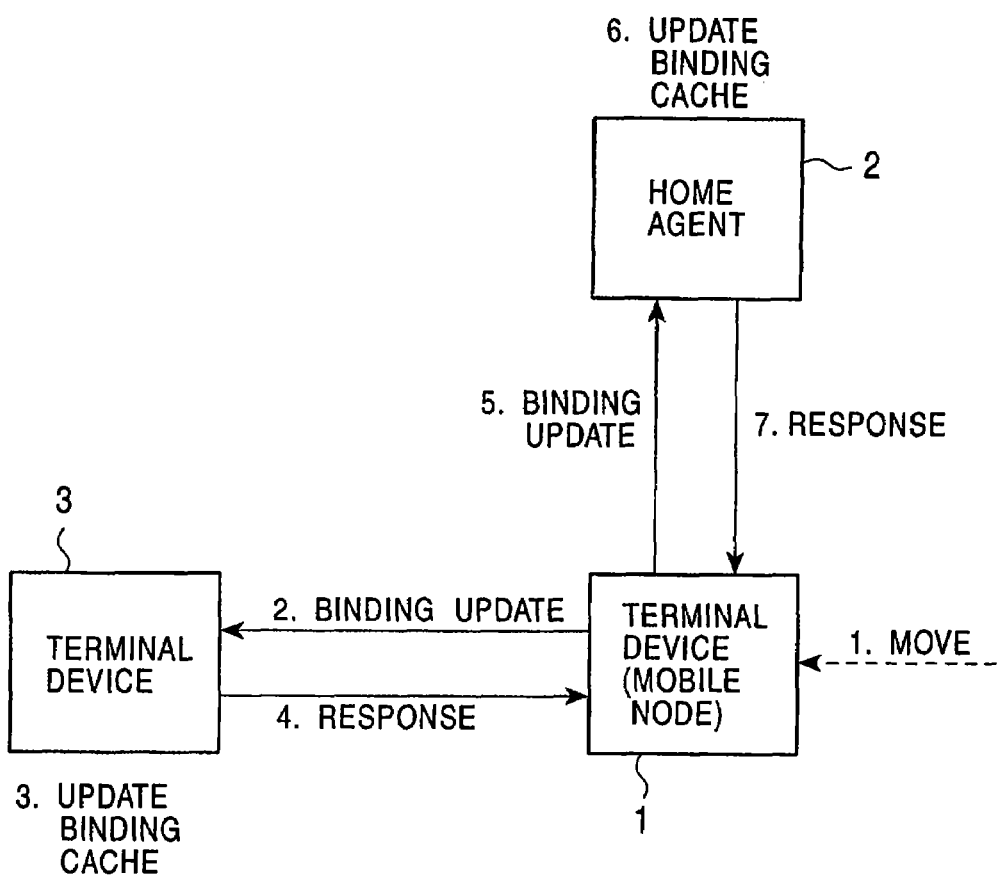
FIG. 13 is a block diagram which illustrates the operation associated with movement of a terminal device.
Figure 16:
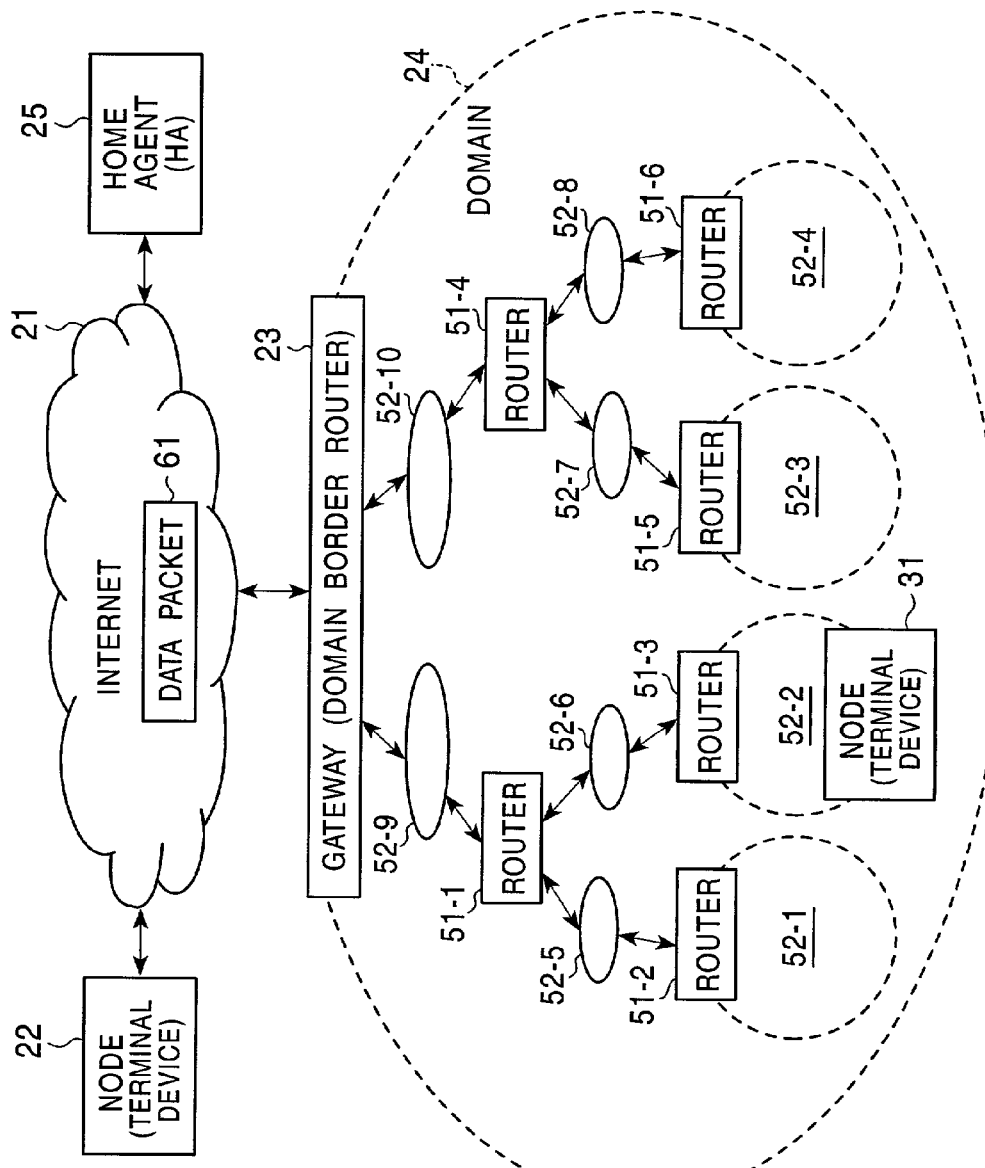
FIG. 16 is a block diagram of an example of the network architecture in accordance with the present invention.

FIG. 16 illustrates an example of the network architecture which implements a communication processing system and a communication processing method in accordance with the present invention. Nodes forming a network communicate based on IPv6 addresses.

Figure 17:
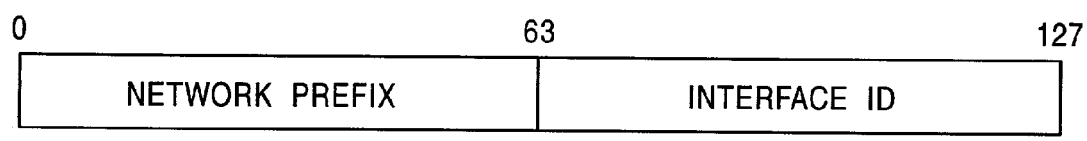
FIG. 17 is a diagram of the structure of an IPv6 address according to the present invention.

As shown in FIG. 17, an IPv6 address is an address of 128 bits comprising an interface ID of the lower 64 bits as a node identifier for uniquely identifying a node on the Internet or a subnetwork, and a network prefix of the upper 64 bits as a position indicator for indicating a subnetwork to which the node is connected. Therefore, in principle, terminal devices which belong to the same subnetwork have IPv6 addresses containing the same network prefix of the upper 64 bits.

In the network architecture shown in FIG. 16, a domain 24 is formed of a plurality of subnetworks 52-1 to 52-10. Herein, a domain is a set of plural subnetworks. For example, if network prefixes ranging from 3ffe:501:100c:0000::/64 to 3ffe:501:100c:ffff::/64 are allocated to subnetworks, respectively, a domain including these subnetworks is defined as a domain to which an address space of 3ffe:501:100c::/48 is allocated, by way of example.

Typically, a network prefix is allocated to every subnetwork. When a node (host) or a terminal device, such as a node 31 shown in FIG. 16, accesses a subnetwork, the node (host) uses the network prefix which is allocated to that subnetwork to configure an address according to stateless auto-configuration specified by RFC2462. Specifically, the node (host) creates an IPv6 address by using both an interface identifier which is locally self-generated information and a network prefix which is information announced by a router. As previously described, an IPv6 address comprises a network prefix and an interface identifier, and the host which is a communicating node uses stateless auto-configuration, specified by RFC2462, to configure its own address.

The information announced by a router is called a router advertisement (RFC2461) message containing a network prefix as link information, an Internet parameter, and the like. A router advertisement is sent from a router in response to a router solicitation message from a host or at regular intervals.

In an architecture of such an address configuration, if a node (host) is a mobile node, the network prefix may change each time the node moves to another subnetwork having a different network prefix, thereby requiring that the IPv6 address of the node be modified. Generally, a network prefix is allocated to each subnetwork by an administrator of the organization (that is, ISP, corporation, university or college, and the like; hereinafter referred to as "domain") that establishes that subnetwork from the address space range allocated to that domain.

According to the present invention, there is no need to modify an IPv6 address of a node when the node moves between subnetworks in a manner described above. Instead, a virtual network prefix which is a prefix specific to a mobile node is applied in the domain 24. The virtual network prefix is a special network prefix for micromobility which does not change if the node moves to a different subnetwork in the same domain.

For example, an address space of 3ffe:501:100c::/48 may be allocated to the domain 24 shown in FIG. 16. Then, physical network prefixes ranging from 3ffe:501:100c::0000::/64 to 3ffe:501:100c::fffe::/64 would be allocated to the subnetworks 52-1 to 52-10 in the domain 24, respectively.

A prefix 3ffe:501:100c::ffff::/64 which is not allocated to any physical network prefix is set as a virtual network prefix used as a micromobility prefix. As defined herein, a physical network prefix is set so as to correspond to a subnetwork existing in a domain, while a virtual network prefix is a network prefix for micromobility rather than a network prefix which is set so as to correspond to a subnetwork existing in a domain.

The allocating and operating strategies for a virtual network prefix are decided by an administrator of each domain. In principle, a network prefix which is not allocated to any subnetwork in a domain is allocated to a prefix for micromobility, thereby allowing a router which handles intra-domain routing to identify the network prefix for micromobility.

A node which accesses a subnetwork in a virtual-network-prefix-supported domain uses the virtual network prefix to configure an address according to stateless auto-configuration. This eliminates the necessity to modify an IPv6 address comprising the virtual network prefix and the interface ID if the node moves to another subnetwork in the domain, because the virtual network prefix can be commonly used among all subnetworks in one domain.

Accordingly, a mobile node can freely move to a different subnetwork in a domain without address renewal, thereby supporting micromobility. For intra-domain routing to a node having an IPv6 address which is configured using a virtual network prefix, host routing based on the interface ID of the lower 64 bits of the IPv6 address is employed. The routing operation is described later in detail.

The network architecture shown in FIG. 16 is now described. The subnetworks 52-1 to 52-10 form a subnetwork by wired or wireless communications or via a communications medium such as shared medium or point-to-point medium, and the subnetworks 52-1 to 52-4 may include a plurality of terminal devices (mobile nodes), such as the node 31, linked thereto. The domain 24 further includes routers 51-1 to 51-6, which form a tree with a domain border router or a gateway 23 as a root. This example provides the logical structure, and the present invention is not limited to such a tree structure in practice; a variety of structures may be used as long as a plurality of subnetworks are being linked.

A terminal device 22 is connected to the Internet 21 as a backbone network, and communicates with the terminal device 31 in the domain 24 across the Internet 21 via the domain border router or gateway 23.

The domain border router or gateway 23 is connected to the routers 51-1 and 51-4 in the domain 24. The routers 51-2 and 51-3 are also connected to the router 51-1. The routers 51-5 and 51-6 are also connected to the router 51-4. Upon receiving a data packet directed for an IPv6 address containing a virtual network prefix, the domain border router 23 and the routers 51-1 to 51-6 control (route) a transmission path of the data packet delivered from the terminal device 22 according to an interface ID of the lower 64 bits of the IPv6 address.

The routing is now briefly described. For example, on the Internet 21, a data packet 61 forwarded to a mobile node (terminal device 31 in FIG. 16) is routed based on the network prefix of the upper 64 bits of the IPv6 address which is written in an endpoint address field of the IPv6 header of the data packet 61 (prefix-based routing). In addition to routing based on the network prefix of the upper 64 bits of the IPv6 address of the data packet 61 forwarded to the mobile node (terminal device 31 in FIG. 16), for intra-domain routing, host routing based on the interface ID of the lower 64 bits of the IPv6 address is used.

If the network prefix of the upper 64 bits of the IPv6 address which is written in the endpoint address field of the IPv6 header of the data packet 61 is a physical network prefix corresponding to a subnetwork in the domain, the routers in the domain perform normal physical-network-prefix-based routing. If the network prefix of the upper 64 bits of the IPv6 address which is written in the endpoint address field of the IPv6 header of the data packet 61 is a virtual network prefix, the routers in the domain perform host routing, that is, routing based on the interface ID of the lower 64 bits of the IPv6 address, to deliver the packet 61 to the mobile node which configures an IPv6 address having the virtual network prefix.

As described above, an IPv6 address comprises a network prefix and an interface identifier, and a host which is a communicating node uses stateless auto-configuration, specified by RFC2462, to configure its own address. The host creates an IPv6 address as its own address using both locally self-generated information and information announced by a router.

The information announced by a router is called a router advertisement (RFC2461) message containing a network prefix as link information, an Internet parameter, and the like. A router advertisement is sent from a router in response to a router solicitation message from a host or at regular intervals.

In the inventive system, a router advertisement sent to a node (host) contains not only a physical network prefix corresponding to the subnetwork to which the node is connected, but also a virtual network prefix which is a network prefix for micromobility.

Figure 18:
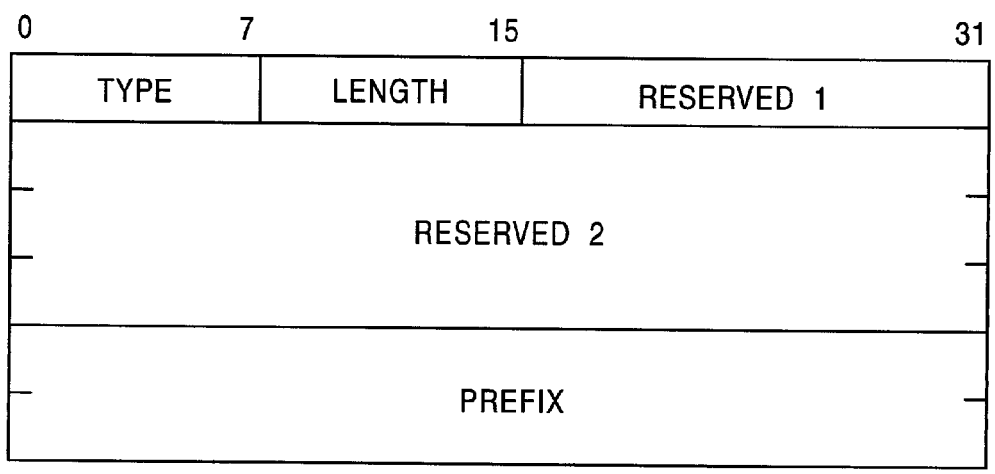
FIG. 18 is a diagram of an example of the network architecture of a virtual network prefix information option format in a router advertisement according to the present invention.

A virtual network prefix can be stored in a router advertisement by adding a new option (virtual network prefix information option) to the router advertisement. FIG. 18 shows the format of a virtual network prefix information option.

The "type" field indicates the option number (No. 1 to 5 are used for the existing options) of this option, the "length" field indicates the overall length of this option, the "reserved 1" and "reserved 2" fields are reserved for future extension, the "prefix" field contains a virtual network prefix. This option is contained together with the prefix information option stored with a physical network prefix in a router advertisement, and the resulting router advertisement is then forwarded.

Specifically, a node which accesses a subnetwork receives the physical network prefix corresponding to this subnetwork, as well as the virtual network prefix for micromobility, as a router advertisement. The node which has received the router advertisement selects the interface identifier which is locally self-generated information, and one of the physical network prefix and the virtual network prefix which is information announced by a router, and creates an IPv6 address using stateless auto-configuration.

As described above, in addition to normal physical-network-prefix-based routing, the routers in the domain perform host routing, that is, routing based on the interface ID of the lower 64 bits of the IPv6 address, to deliver the packet to the mobile node which configures a virtual-network-prefix-based IPv6 address.

For host routing, each router must hold the next hop which is set for each mobile node or each host entry as a routing table. The registration, updating, or deletion process for the host-based routing table is performed by a "routing update message" method which is also used for any other existing micromobility protocol such as cellular IP or HAWAII.

A routing update message is a message which causes a router to update the routing table held by each router, that is, the table which records the next hop in the case where a packet is transferred to a predetermined address. The router which has received the routing update message generates, updates, or deletes a host entry for each mobile node which is contained in the routing table held by the router according to the message.

The mobile node (host) sends a routing update message to a router in the domain when it moves one subnetwork to another. The router which has received the routing update message performs processing according to the message. Specifically, if the router is on the path to the mobile node (host) and if there is no host entry in the routing table held by the router, the router generates a host entry. If the router is on the path to the mobile node (host) and if the host entry already exists, the router updates the host entry, if necessary.

In this way, a router in a domain registers, updates, or deletes the routing table according to a routing update message, thereby achieving intra-domain routing as routing based on the interface ID of the lower 64 bits of the IPv6 address, namely, host-based routing.

If the mobile node implements a macromobility protocol such as Mobile IPv6 (or LIN6), a binding update message, which stores a virtual-network-prefix-based IPv6 address (an IPv6 address which is created according to stateless auto-configuration by using virtual network prefix) as a care-of address (CoA), is sent to a home agent (HA) 25 which manages the mobile node. If the mobile node implements LIN6, a mapping update message, which stores the virtual network prefix as a current locator, is sent to a mapping agent (MA) which is an administrator agent for the mobile node.

In Mobile IPv6, a node has two IP addresses; a home address and a care-of address. The care-of address is an address which may change depending upon a subnetwork to which the node is connected as the node moves, and is a virtual-network-prefix-based IPv6 address in this case. The home address is fixed wherever the node moves.

In Mobile IPv6, the home agent (HA) 25 is a node managing a subnetwork corresponding to the home address of a node. When a communicating node moves, the home agent 25 receives a binding update packet containing a new care-of address, or a virtual-network-prefix-based IPv6 address in this case, from the mobile node to update the binding cache which stores the correlation between the home address and the virtual-network-prefix-based IPv6 address.

Figure 19:
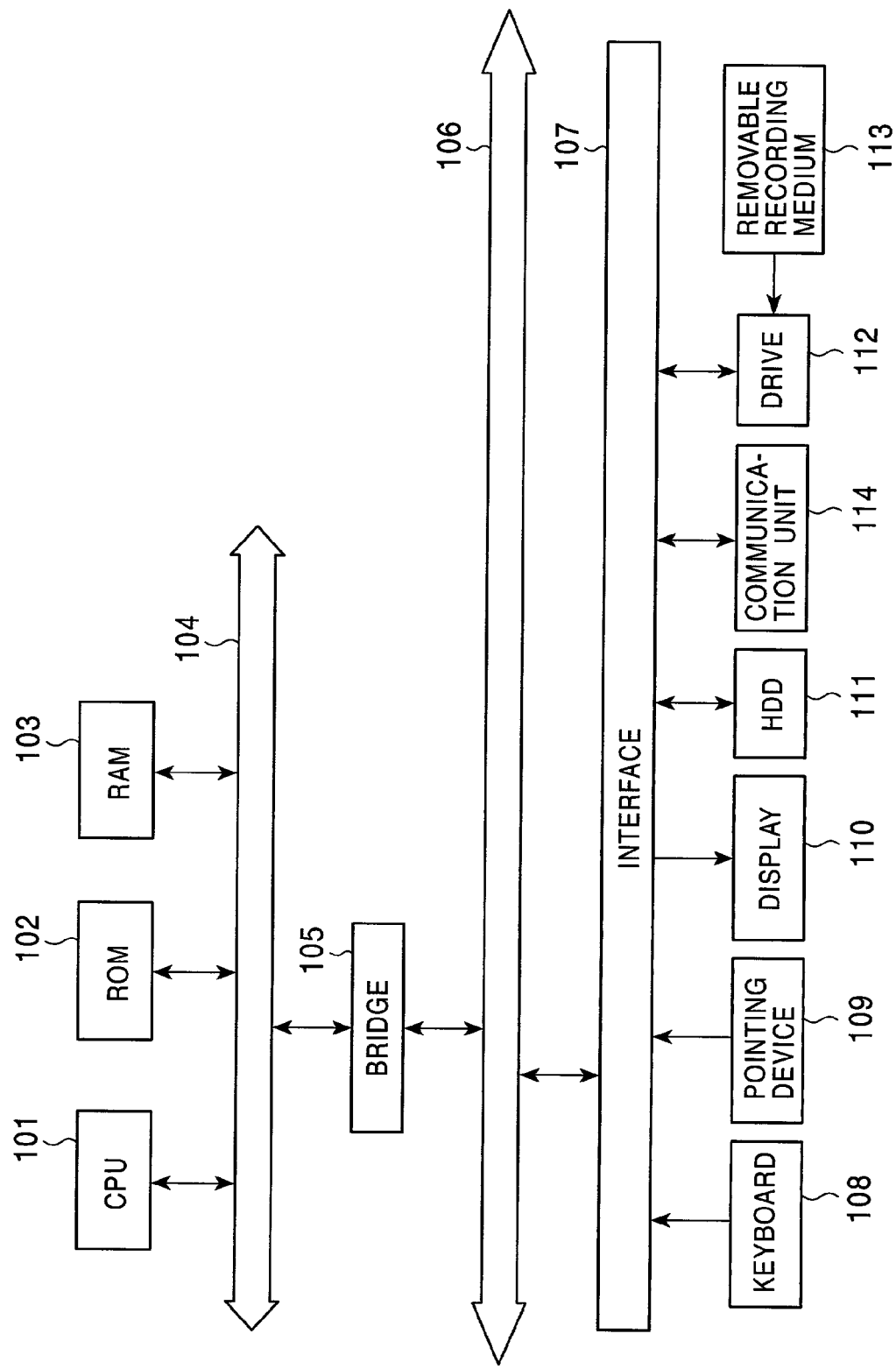
FIG. 19 is a block diagram of the structure of a node according to the present invention.

The structure of the node (terminal device) 31 shown in FIG. 16 is now described with reference to FIG. 19. A CPU (central processing unit) 101 actually executes various application programs or OS (operating system). A ROM (read-only memory) 102 stores the program executed by the CPU 101 or fixed data as a calculation parameter. A RAM (random access memory) 103 is used as a memory area or working area for the program executed by processing of the CPU 101 or parameters which may appropriately change in the program processing.

A host bus 104 is connected to an external bus 106 such as a PCI (peripheral component internet/interface) bus via a bridge 105.

A keyboard 108 is operated by a user to input various instructions to the CPU 101. A pointing device 109 is operated by a user to point out the position or commands on the screen of a display 110. The display 110 can be a CRT (cathode-ray tube) or a liquid crystal display for displaying various information in the form of text, image, and the like. An HDD (hard disk drive) 111 drives a hard disk as an information storage medium to read/write a program or data from/to the hard disk.

A drive 112 drives recording and playback operations of a removable recording medium 113 such as a floppy disk, a CD-ROM (compact disc read-only memory), an MO (magneto optical) disk, a DVD (digital versatile disc), a magnetic disk, or a semiconductor memory. The drive 112 allows a program or data from the removable recording medium 113 to be reproduced, and allows a program or data to be stored in the removable recording medium 113.

To read the program or data recorded in each recording medium and execute or process them in the CPU 101, the read program or data is passed via an interface 107, the external bus 106, the bridge 105, and the host bus 104 to, for example, the RAM 103 connected thereto.

The keyboard 108, the pointing device 109, the display 110, the HDD 111, and the drive 112 are connected to the interface 107. The interface 107 is connected to the CPU 101 via the external bus 106, the bridge 105, and the host bus 104.

A communication unit 114 communicates with routers on the subnetwork to which the node is connected in order to transmit the data supplied from the CPU 101, the HDD 111, etc., which is placed into packets or to receive packets via routers. The communication unit 114 is connected to the CPU 101 via the external bus 106, the bridge 105, and the host bus 104.

Figure 20:
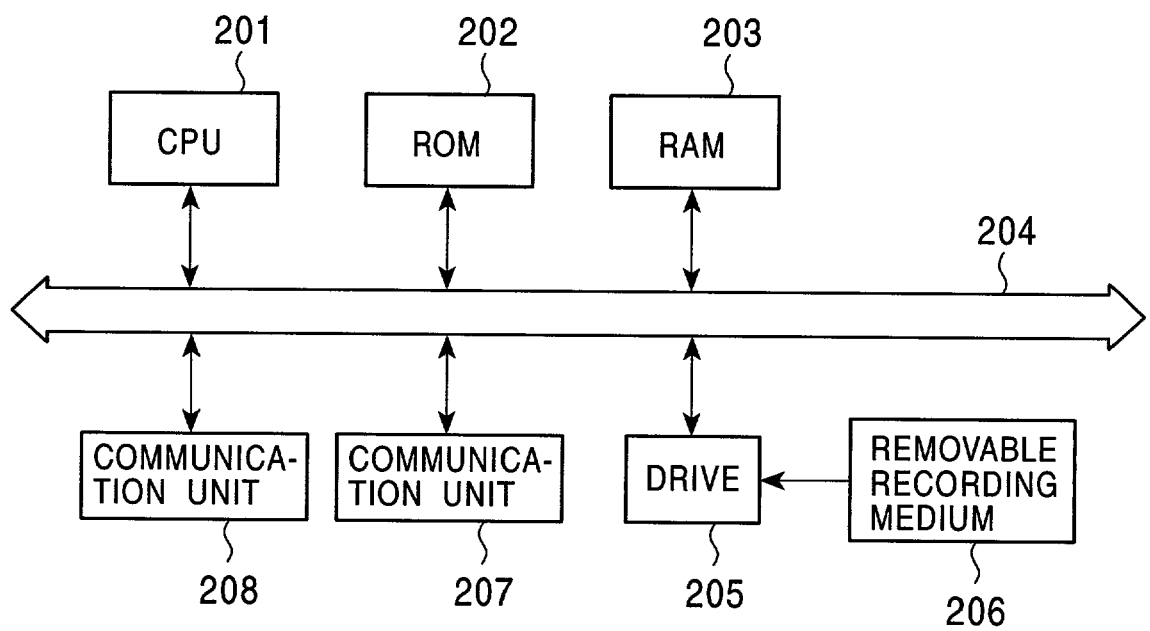
FIG. 20 is a block diagram of the structure of a router according to the present invention.

The structure of a router which relays packets in the domain 24 is now described with reference to FIG. 20.

A CPU (central processing unit) 201 actually executes various application programs or OS (operating system). A ROM (read-only memory) 202 stores the program executed by the CPU 201 or fixed data as a calculation parameter. A RAM (random access memory) 203 is used as a memory area or working area for the program executed by processing of the CPU 201 or parameters which may appropriately change in the program processing.

A drive 205 drives recording and playback operations of a removable recording medium 206 such as a floppy disk, a CD-ROM (compact disc read-only memory), an MO (magneto optical) disk, a DVD (digital versatile disc), a magnetic disk, or a semiconductor memory. The drive 205 allows a program or data from the removable recording medium 206 to be reproduced, and allows a program or data to be stored in the removable recording medium 206. To read the program or data recorded in each recording medium and execute or process them in the CPU 201, the read program or data is passed via a bus 204 to, for example, the RAM 203, and communication units 207 and 208 which are connected thereto.

The communication unit 207 is an high-level-router- or Internet-connected communication unit for transmitting the packets generated by the data processing of the CPU 201, or for receiving packets over the Internet via the high-level router. The communication unit 208 is connected to a subnetwork for transmitting the packets received from the upper-level router to a low-level router or a node via the subnetwork.

The CPU 201, the ROM 202, the RAM 203, the drive 205, and the communication units 207 and 208 can be mutually connected via the bus 204 for data transfer.

In the inventive system, a virtual-network-prefix-supported node which can interpret and process virtual network prefix information or micromobility network prefix contained in a router advertisement coexists with a virtual-network-prefix-unsupported node which cannot interpret and process the virtual network prefix information, that is, which creates an IPv6 address only using a physical network prefix.

Furthermore, the domain 24 shown in FIG. 16 can be implemented as both a virtual-network-prefix-supported domain in which a router in the domain sends a router advertisement containing the above-described virtual network prefix information, and a virtual-network-prefix-unsupported domain in which a router in the domain sends a router advertisement which does not store the above-described virtual network prefix information but only physical network prefix information. The inventive system also supports inter-domain routing when a virtual-network-prefix-supported node moves between domains of the two types.

Figure 21:
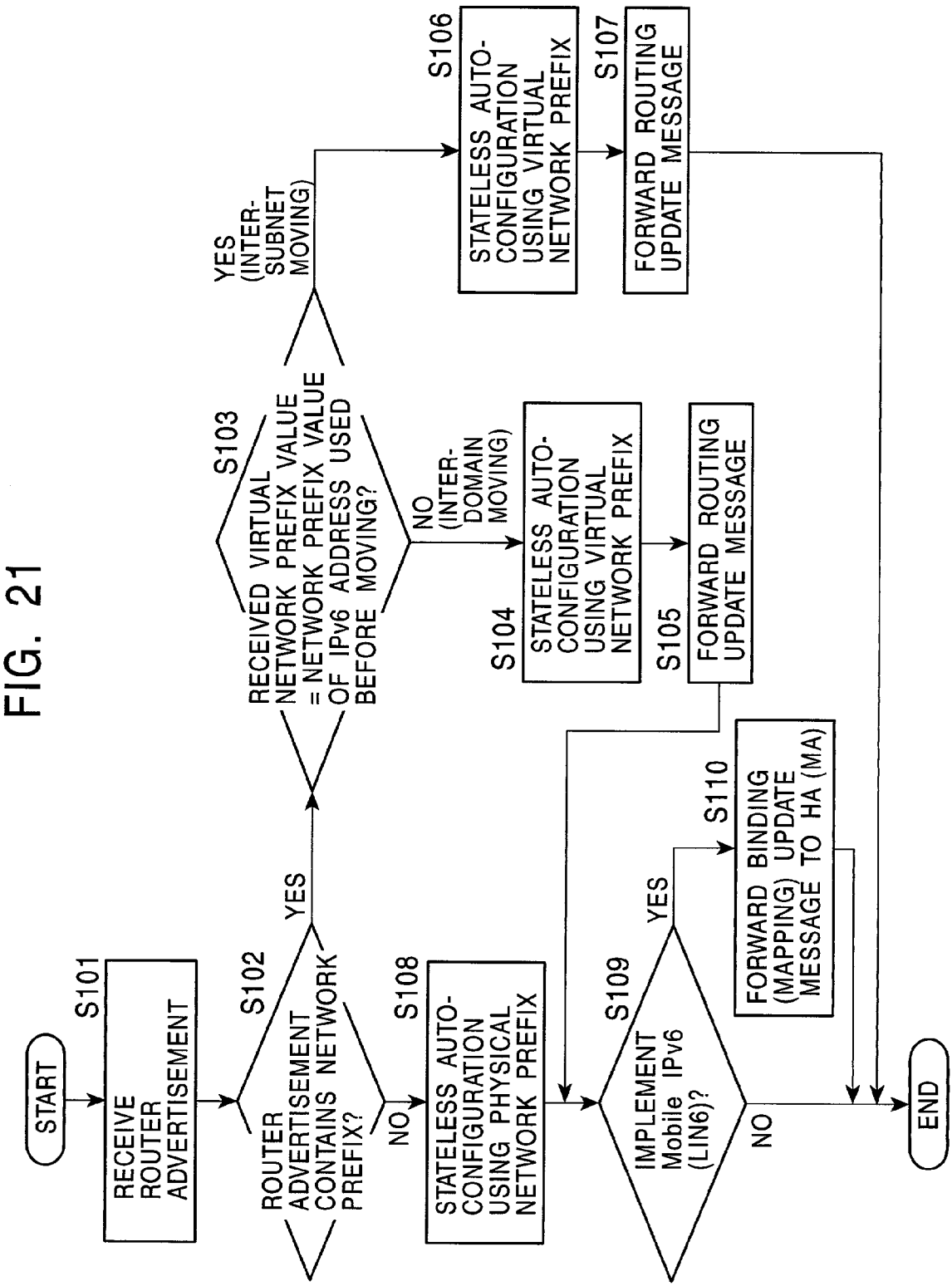
FIG. 21 is a flowchart of the process associated with movement of a virtual-network-prefix-supported node according to the present invention.
Figure 22:
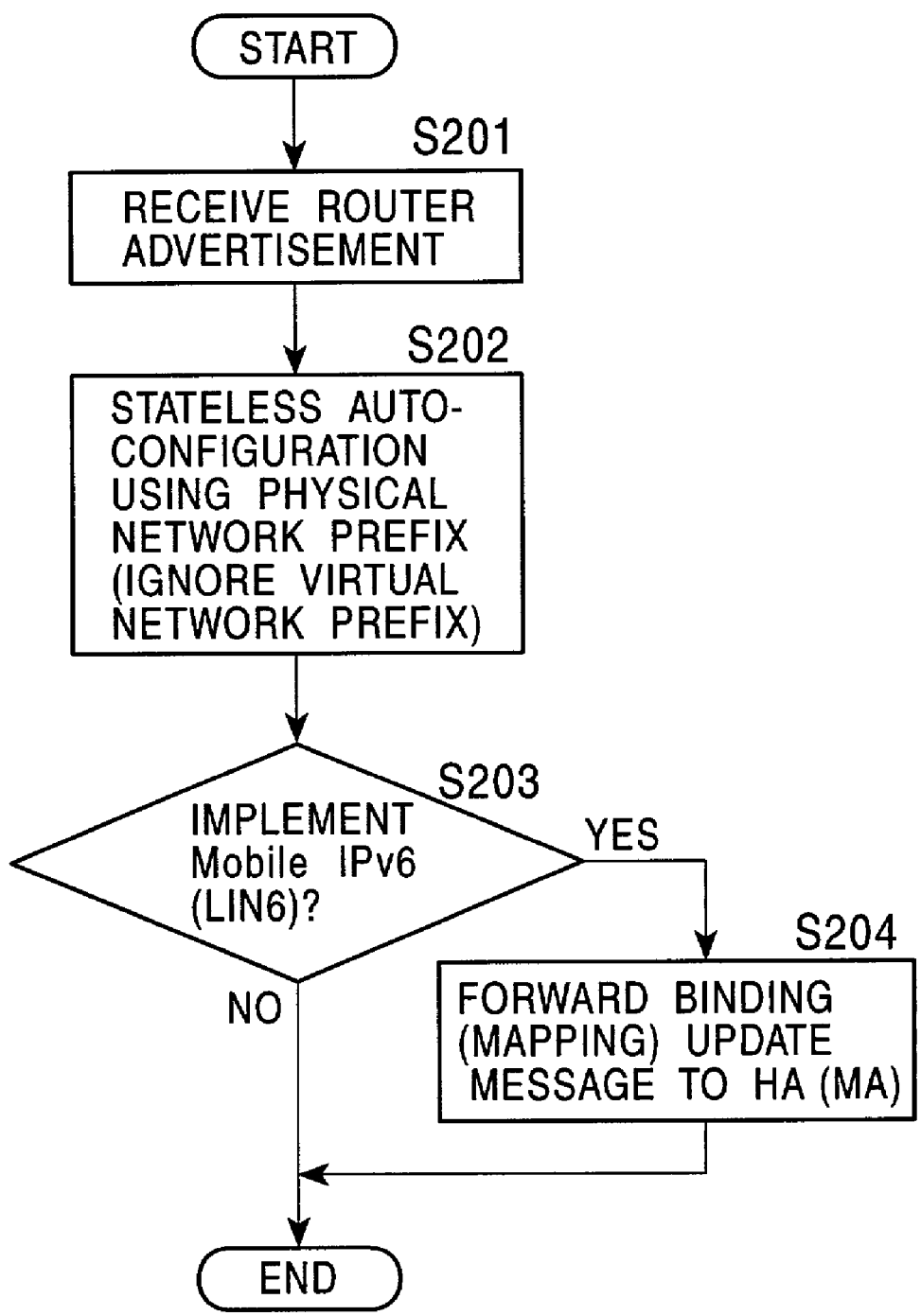
FIG. 22 is a flowchart of the process associated with movement of a virtual-network-prefix-unsupported node according to the present invention.

The processing of a virtual-network-prefix-supported node and a virtual-network-prefix-unsupported node according to the present invention is now described. FIG. 21 shows a flowchart of the processing of a virtual-network-prefix-supported node, and FIG. 22 shows a flowchart of a processing of the virtual-network-prefix-unsupported node.

Processing of Virtual-Network-Prefix-Supported Node

First, the processing of a virtual-network-prefix-supported node is described. The event where a virtual-network-prefix-supported node moves is classified into the following three types (1) to (3) depending upon the content of the router advertisement received by the node from a router on a subnetwork at the point to which it moved:

(1) If the router advertisement contains a virtual network prefix, and its value is different from the network prefix portion of the IPv6 address of the mobile node which has been configured before it moves, then this type indicates that the node moves to a new virtual-network-prefix-supported domain from a different domain.

(2) If the router advertisement contains a virtual network prefix, and its value is equal to the network prefix portion of the IPv6 address of the mobile node which has been configured before it moves, then this type indicates that the mode moves from one subnetwork to another in a virtual-network-prefix-supported domain.

(3) If the router advertisement does not contain a virtual network prefix but contains only a physical network prefix, then this type indicates that the node moves to a subnetwork in a virtual-network-prefix-unsupported domain.

In this way, a virtual-network-prefix-supported node determines its own moving type according to the network prefix information contained in the router advertisement received from a router on a subnetwork to which the node is newly connected at the point to which it moved. Then, the virtual-network-prefix-supported node executes processing according to the determined type. The processing of a virtual-network-prefix-supported node in the above three cases (1) to (3) is now described with reference to the flowchart shown in FIG. 21.

(1) Case where a node moves to a new virtual-network-prefix-supported domain from a different domain In the case where a virtual-network-prefix-supported node moves to a new virtual-network-prefix-supported domain from a different domain, the process follows steps S101, S102, S103, S104, S105, S109, and S110 in the flowchart of FIG. 21.

First, at step S101, the mobile node receives a router advertisement from a router on the subnetwork to which the node is connected. The subnetwork to which the node is newly connected after it moved is a virtual-network-prefix-supported domain, and the router advertisement contains both a physical network prefix and a virtual network prefix. Hence, the positive decision is obtained at step S102, and the process proceeds to step S103.

At step S103, the mobile node determines whether or not the virtual network prefix value in the router advertisement is equal to the network prefix of the upper 64 bits of the IPv6 address which was used before it moves. The virtual network prefix is a unique prefix in the domain, and is configured by an administrator entity under different administration to be valid micromobility network prefix only in the administered domain. Therefore, if the mobile node moves to a different domain, the virtual network prefix value in the newly received router advertisement will be different from the network prefix of the upper 64 bits of the IPv6 address which was used before it moves. Hence, the negative decision is obtained at step S103, and the process proceeds to step S104.

At step S104, the mobile node retrieves the virtual network prefix from the router advertisement, and uses the virtual network prefix to create an IPv6 address according to stateless auto-configuration.

The IPv6 address created according to stateless auto-configuration is referred to as "virtual-network-prefix-based IPv6 address or v.n.p.-based IPv6 address." To the contrary, the IPv6 address which is configured using a physical network prefix is referred to as "physical-network-prefix-based IPv6 address or p.n.p.-based IPv6 address."

At step S104, for creating an IPv6 address according to stateless auto-configuration using the virtual network prefix, the virtual-network-prefix-supported node distinguishes the virtual network prefix from the physical network prefix in the router advertisement, and selects the virtual network prefix to create an IPv6 address according to stateless auto-configuration, while the physical network prefix is ignored.

In this approach, it is insufficient that the lower 64 bits of the IPv6 address, that is, the interface ID value, is unique in a subnetwork, and it must be unique at least in a domain. This is because since the virtual network prefix is used not only in the subnetwork to which the node is currently connected but also in other subnetworks in the same domain, if two nodes connecting to different subnetworks use the same interface ID, the virtual network prefixes of the two nodes will be completely the same. For this reason, desirably, an interface ID is allocated when a node is connected so that the interface ID is unique in each domain, or a duplicated address detection (DAD) process is performed when the node is connected in order to determine whether or not there is no other node which is using the interface ID which is to be used by the node. Otherwise, the interface ID which is unique itself over the Internet would be desirable. For example, EUI64 of MAC address for Ethernet may be used.

At step S105, the mobile node sends a routing update message in order that host routing with respect to the configured virtual-network-prefix-based IPv6 address is performed in the domain.

As earlier described, the routing update message is a message which causes a router to update the routing table held by each router, that is, the table which records the next hop in the case where a packet is transferred to a predetermined address. The router which has received the routing update message generates, updates, or deletes a host entry for each mobile node which is contained in the routing table held by the router according to the message.

The mobile node performs the process which follows steps S109 and S110. If the mobile node implements a macromobility protocol such as Mobile IPv6 (or LIN6) (the positive decision at step S109), then a binding update message, in which the virtual-network-prefix-based IPv6 address is stored as a care-of address (CoA), is forwarded to the home agent of the mobile node. In LIN6, a mapping update message, in which the virtual network prefix is stored as a current locator, is forwarded to a mapping agent (MA) which is an administrator agent for the mobile node.

As previously described, in Mobile IPv6, a node has two IP addresses; a home address and a care-of address. The care-of address may change depending upon a subnetwork to which the node is connected as the node moves, and is a virtual-network-prefix-based IPv6 address in this case. The home address is fixed wherever the node moves.

In Mobile IPv6, a home agent (HA) is a node managing a subnetwork corresponding to the home address of a mobile node. When a communicating node moves, the home agent receives a binding update packet containing a new care-of address, or a virtual-network-prefix-based IPv6 address in this case, from the mobile node to update a binding cache which stores the correlation between the home address and the virtual-network-prefix-based IPv6 address.

In the LIN6 macromobility protocol, the mobile node sends a mapping update message, in which the virtual network prefix is stored as a current locator, to a mapping agent (MA) which is an administrator agent for the mobile node. The mapping agent (MA) updates a binding cache which stores the correlation between the home address and the virtual-network-prefix-based IPv6 address according to the mapping update message.

If the mobile node does not implement a macromobility protocol such as Mobile IPv6 or LIN6 (the negative decision at step S109), step S110 where the binding update packet is forwarded is not performed, and the process ends.

After then, when a packet is sent, the mobile node uses the configured virtual-network-prefix-based IPv6 address as the originating address of the header of the packet.

The communications process with a terminal device which is to communicate with a virtual-network-prefix-supported node that processes in this way is performed in the following manner, by way of example. The terminal device which is to communicate with a mobile node queries a domain name server as to the host name of the mobile node, and the domain name server announces the home address of the mobile node to the terminal device. The terminal device sends a data packet in which the home address of the mobile node is assigned to the destination IPv6 address.

The home agent further incorporates (encapsulates) the IPv6 header, in which the virtual-network-prefix-based IPv6 address is assigned to the destination address, in the data packet destined for the mobile node's home address received from the terminal device, and sends (transfers) the resulting packet to the mobile node over the Internet.

The routing based on the virtual network prefix in the IPv6 address is performed by the routers on the Internet, while host-based routing is performed by the routers in the domain to which the mobile node belongs. Then, the data packet from the terminal device which is to communicate with the mobile node is transferred to the mobile node. A specific example of the communications process is described later in greater detail.

(2) Case where a node moves from one subnetwork to another in a virtual-network-prefix-supported domain Next, the process in the case where a virtual-network-prefix-supported node moves from one subnetwork to another in a virtual-network-prefix-supported domain is now described. This process follows steps S101, S102, S103, S106, and S107 in the flowchart of FIG. 21.

First, at step S101, the mobile node receives a router advertisement from a router on the subnetwork to which the node is connected. The subnetwork to which the node is newly connected after it moved is a virtual-network-prefix-supported domain, and the router advertisement contains both a physical network prefix and a virtual network prefix. Hence, the positive decision is obtained at step S102, and the process proceeds to step S103.

At step S103, the mobile node determines whether or not the virtual network prefix value in the router advertisement is equal to the network prefix of the upper 64 bits of the IPv6 address which was used before it moves. The virtual network prefix is a unique prefix in the domain, and is unchanged even if the subnetwork to which the node is connected changes in the same domain. Since the node moves in the same domain in this case, the virtual network prefix value in the received router advertisement is equal to the network prefix of the upper 64 bits of the IPv6 address which was used before it moves. Hence, the positive decision is obtained at step S103, and the process proceeds to step S106.

At step S106, the mobile node retrieves the virtual network prefix from the router advertisement, and creates an IPv6 address according to stateless auto-configuration. Since the virtual network prefix value stored in the router advertisement is equal to the network prefix portion of the IPv6 address of the mobile node which was configured before it moves (that is, the network prefix value stored in the router advertisement received from a router on the subnetwork to which the mobile node was connected before it moves), the mobile node can still use the same IPv6 address, namely, the same virtual-network-prefix-based IPv6 address, after stateless auto-configuration.

At step S107, the mobile node sends a routing update message in order that host routing is performed with respect to the configured virtual-network-prefix-based IPv6 address is performed in the domain.

As earlier described, the routing update message is a message which causes a router to update the routing table held by each router, that is, the table which records the next hop in the case where a packet is transferred to a predetermined address. The router which has received the routing update message generates, updates, or deletes a host entry for each mobile node which is contained in the routing table held by the router according to the message.

After then, when a packet is sent, the mobile node uses the configured virtual-network-prefix-based IPv6 address as the originating address of the header of the packet.

If the node moves in the same domain, steps S109 and S110 are not performed. Specifically, if the node moves in the same domain, the IPv6 address of the mobile node does not change if the node moves to a different subnetwork. Thus, if macromobility such as Mobile IPv6 (or LIN6) is implemented, it is not necessary to send a binding update message (or a mapping update message in LIN6).

Since the IPv6 address of the mobile node which moves in the same domain would not change even if the mobile node moves to a different subnetwork, it is not necessary for a home agent (HA) or a mapping agent (MA) to update the binding cache which stores the correlation between the home address and the virtual-network-prefix-based IPv6 address. This does not require that the mobile node send a binding update packet containing the virtual-network-prefix-based IPv6 address to the home agent (HA) or the mapping agent (MA).

According to the present invention, therefore, a large number of binding update messages or mapping update messages are not generated even if a node frequently moves from one subnetwork to another, thereby reducing the network load.

In this way, if a virtual-network-prefix-supported node moves from one subnetwork to another in a virtual-network-prefix-supported domain, what is only performed by the mobile node is to send a routing update message to update a host entry for the virtual-network-prefix-based IPv6 address of the mobile node which is held by each router for host routing in the domain. Therefore, the routing process associated with the node which moves between subnetworks is performed only in the domain, thereby only requiring a very small delay even if the node frequently moves.

(3) Case where a node moves to a subnetwork in a virtual-network-prefix-unsupported domain from a different domain Next, the process in the case where a virtual-network-prefix-supported node moves to a virtual-network-prefix-unsupported domain from a different domain is now described. This process follows steps S101, S102, S108, S109, and S110 in the flowchart of FIG. 21.

First, at step S101, a mobile node receives a router advertisement from a router on the subnetwork to which the node is connected. The subnetwork to which the node is newly connected after it moved is a virtual-network-prefix-unsupported domain, and the router advertisement does not contain a virtual network prefix but only a physical network prefix. Hence, the negative decision is obtained at step S102, and the process proceeds to step S108.

At step S108, the mobile node retrieves the physical network prefix from the router advertisement, and uses the physical network prefix to create an IPv6 address according to stateless auto-configuration.

The mobile node performs the process which follows steps S109 and S110. If the mobile node implements a macromobility protocol such as Mobile IPv6 (or LIN6) (the positive decision at step S109), then a binding update message, in which the physical-network-prefix-based IPv6 address corresponding to the subnetwork at the point to which it moved is stored as a care-of address (CoA), is forwarded to the home agent of the mobile node. In LIN6, a mapping update message, in which the physical network prefix is stored as a current locator, is forwarded to a mapping agent (MA) which is an administrator agent for the mobile node.

In Mobile IPv6, a home agent (HA) is a node managing a subnetwork corresponding to the home address of a mobile node. When a communicating node moves, the home agent receives a binding update packet containing a new care-of address, or a physical-network-prefix-based IPv6 address in this case, from the mobile node to update a binding cache which stores the correlation between the home address and the physical-network-prefix-based IPv6 address.

If the LIN6 macromobility protocol, the mobile node sends a mapping update message, in which the physical network prefix is stored as a current locator, to a mapping agent (MA) which is an administrator agent for the mobile node. The mapping agent (MA) updates a binding cache which stores the correlation between the home address and the physical-network-prefix-based IPv6 address according to the mapping update message.

If the mobile node does not implement a macromobility protocol such as Mobile IPv6 or LIN6 (the negative decision at step S109), step S110 where the binding update packet is forwarded is not performed, and the process ends.

After then, when a packet is sent, the mobile node uses the configured physical-network-prefix-based IPv6 address as the originating address of the header of the packet.

Processing of Virtual-Network-Prefix-Unsupported Node

Next, the processing of a virtual-network-prefix-unsupported node is described. The process of a virtual-network-prefix-unsupported node follows the steps in the flowchart show in FIG. 22.

First, at step S201, the mobile node receives a router advertisement from a router on the subnetwork to which the node is connected. Then, at step S202, whether or not the subnetwork to which the node is newly connected after it moved supports a virtual network prefix, the mobile node retrieves the physical network prefix from the router advertisement, and uses the physical network prefix to create an IPv6 address according to stateless auto-configuration. A virtual network prefix will be ignored even if it is stored in the router advertisement because it is not recognized. After address configuration, a normal IPv6 communication operation can be performed.

The mobile node performs the process which follows steps S203 and S204. If the mobile node implements a macromobility protocol such as Mobile IPv6 (or LIN6) (the positive decision at step S203), then a binding update message, in which the physical-network-prefix-based IPv6 address corresponding to the subnetwork at the point to which it moved is stored as a care-of address (CoA), is forwarded to the home agent of the mobile node. In LIN6, a mapping update message, in which the physical network prefix is stored as a current locator, is forwarded to a mapping agent (MA) which is an administrator agent for the mobile node.

In Mobile IPv6, a home agent (HA) is a node managing a subnetwork corresponding to the home address of a mobile node. When a communicating node moves, the home agent receives a binding update packet containing a new care-of address, or a physical-network-prefix-based IPv6 address corresponding to the subnetwork at the point to which it moved in this case, from the mobile node to update a binding cache which stores the correlation between the home address and the physical-network-prefix-based IPv6 address.

In the LIN6 macromobility protocol, the mobile node sends a mapping update message, in which the physical network prefix is stored as a current locator, to a mapping agent (MA) which is an administrator agent for the mobile node. The mapping agent (MA) updates a binding cache which stores the correlation between the home address and the physical-network-prefix-based IPv6 address according to the mapping update message.

If the mobile node does not implement a macromobility protocol such as Mobile IPv6 or LIN6 (the negative decision at step S203), step S204 where the binding update packet is forwarded is not performed, and the process ends.

Specific Form of the Communication Process

The process at each phase of a terminal device in accordance with the present invention is now described in detail.

<Mobile Node's Connection to Domain>

First, the process to connecting a virtual-network-prefix-supported mobile node to a subnetwork in a virtual-network-prefix-supported domain is described.

Figure 23:
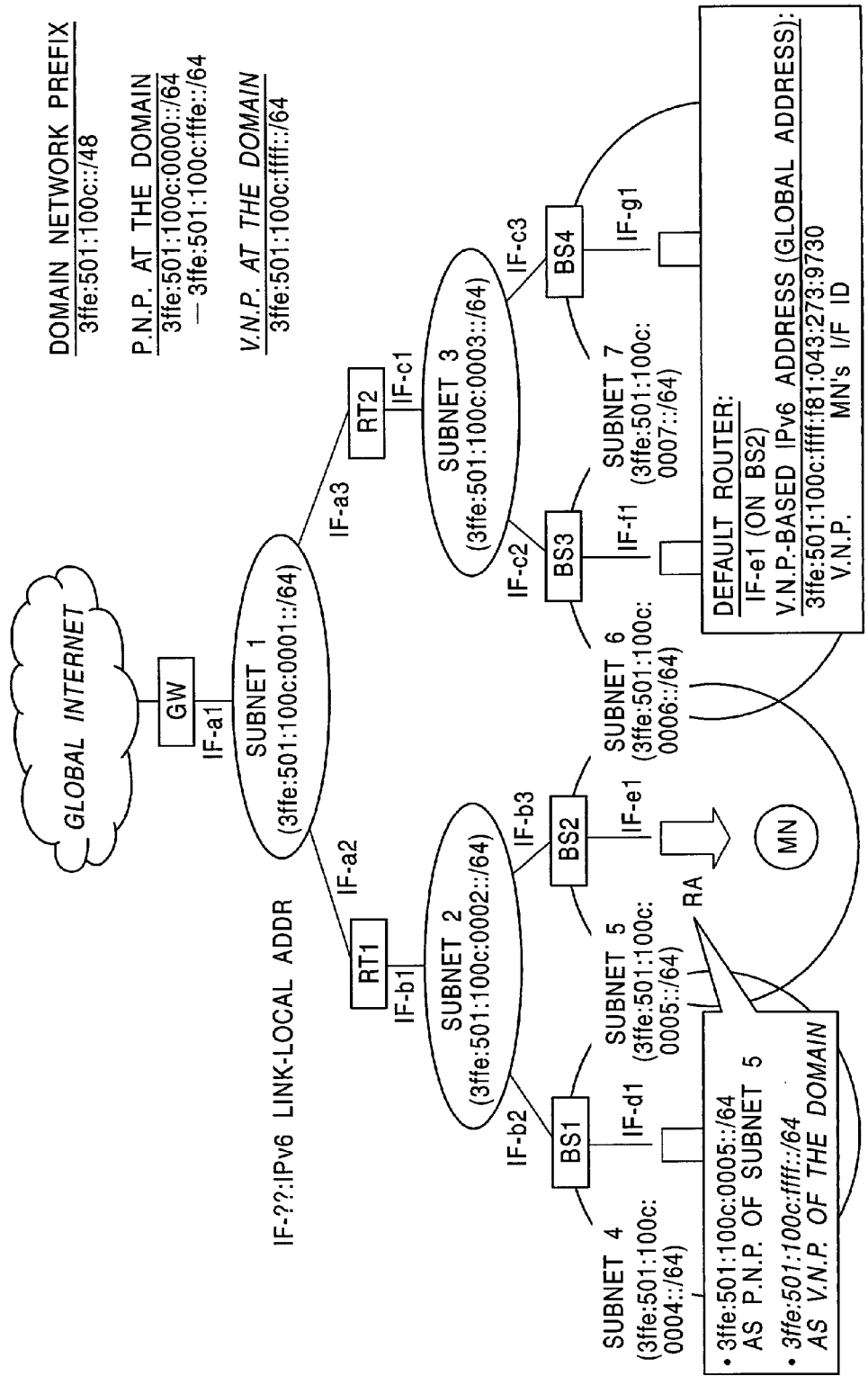
FIG. 23 is a diagram which illustrates how virtual-network-prefix-supported node is connected to a domain according to the present invention.

FIG. 23 shows a domain on the Internet. This domain is a virtual-network-prefix-supported domain. The domain includes subnetworks 1 to 7. The domain further includes a gateway (GW), and routers RT1, RT2, and BS1 to BS4. The gateway (GW) is a domain border router at the domain border.

Interfaces IF-a1 to IF-a3, IF-b1 to IF-b3, IF-c1 to IF-c3, IF-d1, IF-e1, IF-f1, and IF-g1 are IPv6 link-local addresses configured by the interfaces through which the routers are connected to the subnetwork.

An address space of 3ffe:501:100c::/48 is allocated to this domain, and the domain's administrator uses 3ffe:501:100c:ffff::/64 as a virtual network prefix. The physical network prefixes are allocated with 3ffe:501:100c:0000::/64 to 3ffe:501:100c:fffe::/64, and the subnetworks 1 to 7 are allocated with 3ffe:501:100c:0001::/64 to 3ffe:501:100c:0007::/64, respectively.

The routers BS1 to BS4 send router advertisements (RA) to the subnetworks 4 to 7, respectively. For example, as shown in FIG. 23, the router BS2 sends the subnetwork 5 a router advertisement containing not only the physical network prefix (3ffe:501:100c:0005::/64) allocated to the subnetwork 5 but also the virtual network prefix (3ffe:501:100c:ffff::/64) allocated for micromobility in the domain.

It is assumed that a virtual-network-prefix-supported mobile node (MN) which implements Mobile IPv6 is connected to the subnetwork 5 in the domain.

It is assumed that the mobile node (MN) has an interface ID of f81:043:273:9730 which is unique over the Internet. When the mobile node (MN) accesses the subnetwork 5, it receives the router advertisement sent from the router BS2 for the subnetwork 5.

The router advertisement sent from the router BS2 for the subnetwork 5 contains the physical network prefix (3ffe:501:100c:0005::/64) allocated to the subnetwork 5, and the virtual network prefix (3ffe:501:100c:ffff::/64) allocated for micromobility in the domain.

The mobile node (MN) creates an address according to stateless auto-configuration in which the virtual network prefix (3ffe:501:100c:ffff::/64) allocated for micromobility in the domain which is contained in the received router advertisement is placed at the upper 64 bits and the interface ID (f81:043:273:9730) of the mobile node (MN) is placed at the lower 64 bits. A virtual-network-prefix-based IPv6 address of 3ffe:501:100c:ffff:f81:043:273:9730 is thus configured.

Furthermore, as shown in FIG. 23, IPv6 link-local address, IF-e1, which is assigned to the interface on the subnetwork 5 for the router BS2 is specified as a default router of the mobile node (MN). Then, the mobile node (MN) sends a routing update message to create a host entry for the virtual-network-prefix-based IPv6 address (3ffe:501:100c:ffff:f81:043:273:9730) in the routing table of the routers in the domain.

As previously described, the routing update message is a message which causes a router to update the routing table held by each router, that is, the table which records the next hop in the case where a packet is transferred to a predetermined address. The router which has received the routing update message generates, updates, or deletes a host entry for each mobile node which is contained in the routing table held by the router according to the message.

The mobile node (MN) sends the routing update message, in which the virtual-network-prefix-based IPv6 address 3ffe: 501:100c:ffff:f81:043:273:9730 which has been created according to stateless auto-configuration is stored as the care-of address (CoA) of the new point, to the home agent (HA) of the mobile node (MN). The routing update message and binding update message travel through the routers in the domain, and each of the routers updates the entry of the mobile node (MN) in the routing table. The home agent (HA) which has received the binding update message updates the binding cache which stores the correlation between the home address of the mobile node (MN) and the virtual-network-prefix-based IPv6 address.

<Packet Transfer to Mobile Node>

The packet transfer process to a virtual-network-prefix-supported mobile node connected to a subnetwork in a virtual-network-prefix-supported domain is now described with reference to FIG. 24.

As previously described, host routing based on the interface ID of the lower 64 bits of an IPv6 address is employed for intra-domain routing to a node having an IPv6 address configured using a virtual network prefix.

Figure 24:
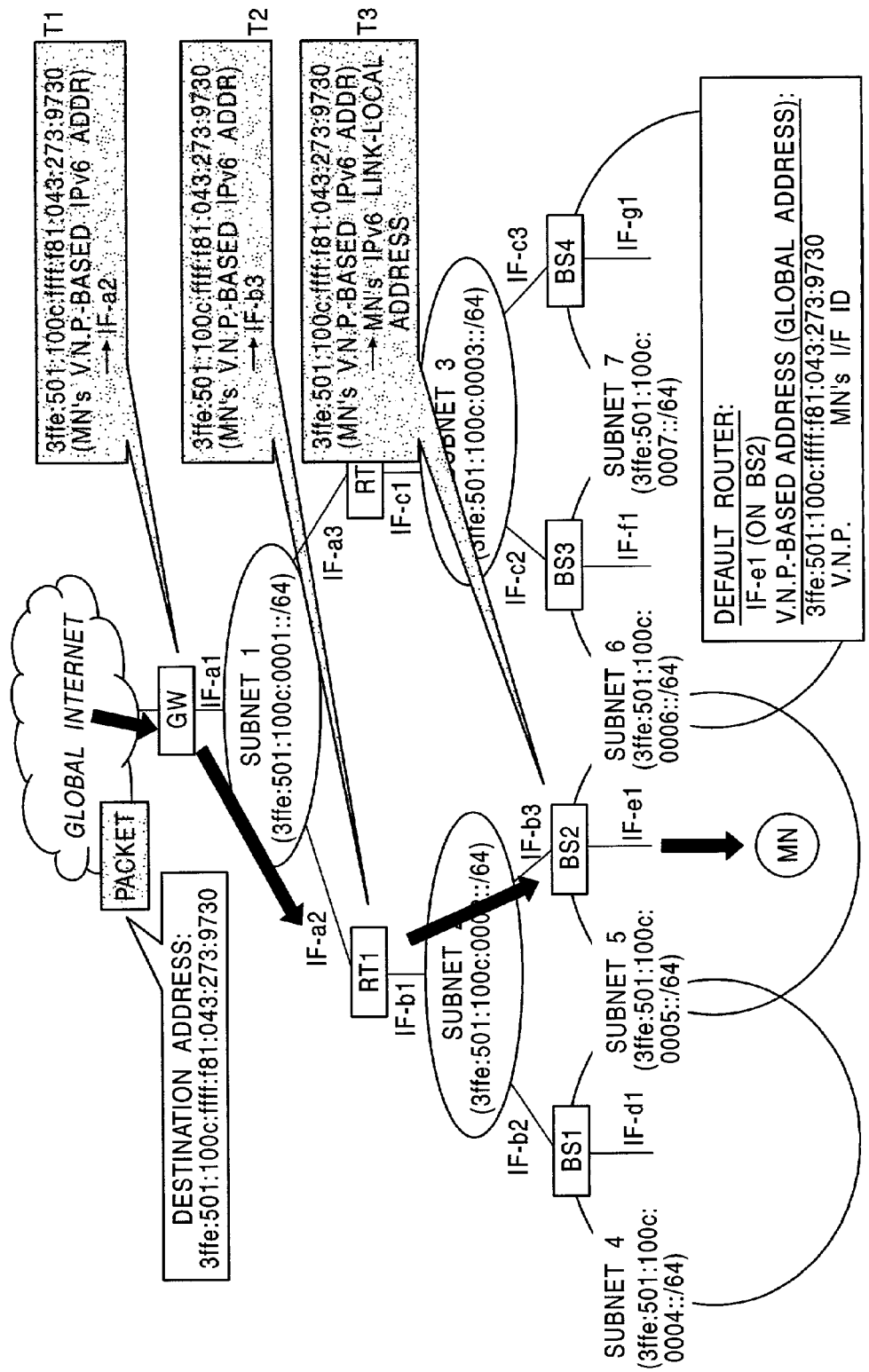
FIG. 24 is a diagram which illustrates how a packet is transferred to a virtual-network-prefix-supported node according to the present invention.

In FIG. 24, after the mobile node (MN) sent a routing update message in FIG. 23, each of the routers generates, updates, or deletes a host entry for the mobile node (MN), and a gateway (GW) or a domain border router receives a packet having a destination address of 3ffe:501:100c:ffff:f81:043:273:9730 destined for the mobile node (MN) over the global internet.

Tables T1 to T3 indicated at the upper right portion in FIG. 24 indicate host entries for the virtual-network-prefix-based IPv6 address (3ffe:501:100c:ffff:f81:043:273:9730) of the mobile node (MN) which are stored in the routing table held by each of the routers GW, RT1, and BS2.

Upon receiving a packet destined for the mobile node (MN) from the global internet external to the domain, the gateway (GW) or a domain border router references to the host entry T1 for the mobile node (MN) which is stored in the routing table held by the gateway (GW) to transfer the received packet to an IPv6 link-local address (IF-a2) assigned to the next hop of the host entry T1. The IPv6 link-local address (IF-a2) assigned to the next hop of the host entry T1 corresponds to an address of the interface to which the router RT1 is connected. The packet is received by the router RT1.

Upon receiving the packet destined for the mobile node (MN) from the gateway (GW), the router RT1 references to the host entry T2 for the mobile node (MN) which is stored in the routing table held by the router RT1 to transfer the received packet to an IPv6 link-local address (IF-b3) assigned to the next hop of the host entry T2. The IPv6 link-local address (IF-b3) assigned to the next hop of the host entry T2 corresponds to an address of the interface to which the router BS2 is connected. The packet is received by the router BS2.

Upon receiving the packet destined for the mobile node (MN) from the router RT1, the router BS2 references to the host entry T3 for the mobile node (MN) which is stored in the routing table held by the router BS2 to transfer the received packet to an IPv6 link-local address (MN's IPv6 link-local address) assigned to the next hop of the host entry T3. The IPv6 link-local address (mobile node (MN) IPv6 link-local address) assigned to the next hop of the host entry T3 corresponds to an address of the mobile node (MN). The packet is received by the mobile node (MN).

<Mobile Node's Movement between Subnetworks>

The process for a virtual-network-prefix-supported mobile node connected to a subnetwork in a virtual-network-prefix-supported domain to move from one subnetwork to another is now described with reference to FIG. 25.

Figure 25:
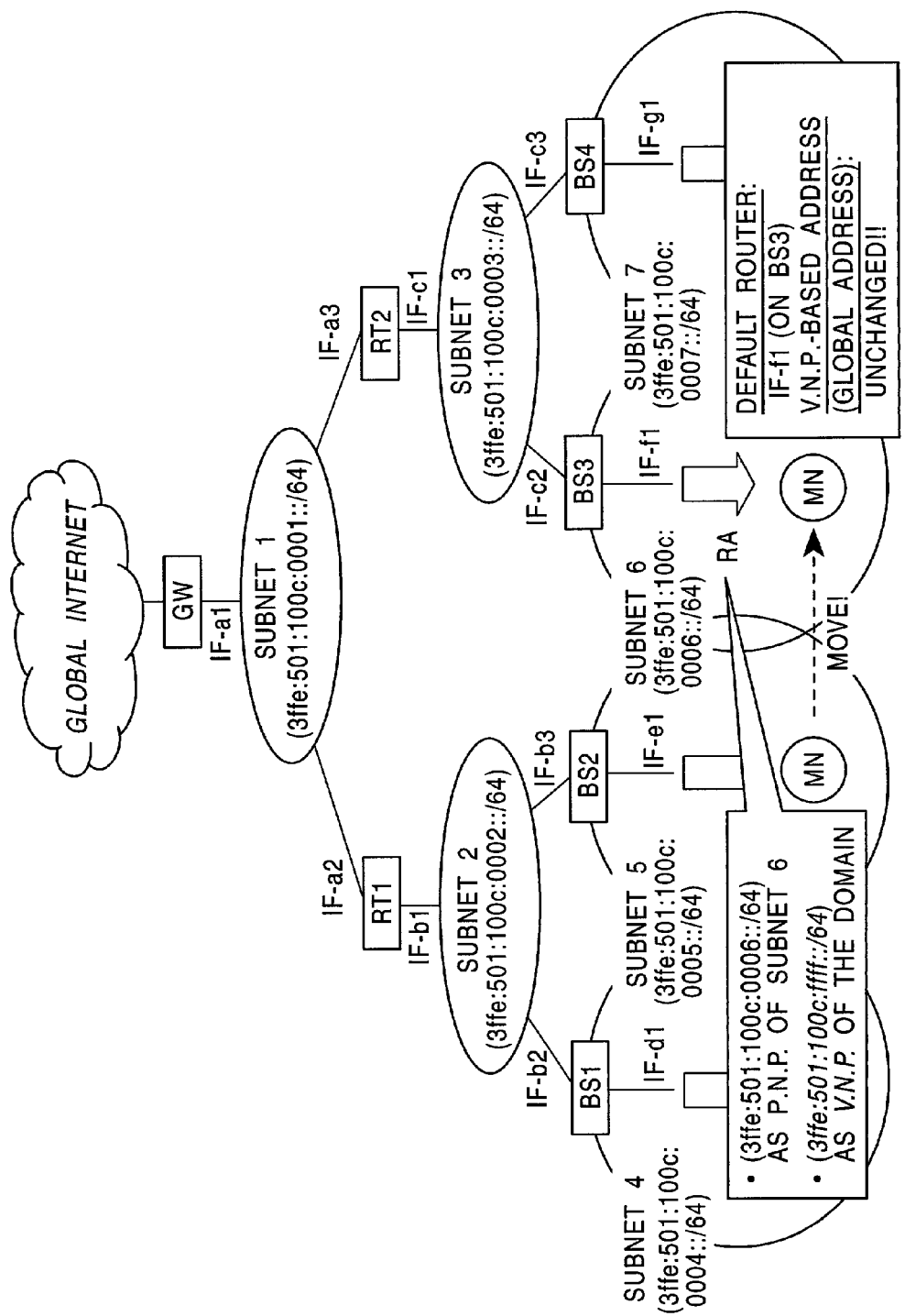
FIG. 25 is a diagram which illustrates how a virtual-network-prefix-supported node moves from one subnetwork to another according to the present invention.

In FIG. 25, the mobile node (MN) moves from the subnetwork 5 to the subnetwork 6 in the communication state illustrated in FIG. 23. When the mobile node MN accesses the subnetwork 6, it receives a router advertisement from the router BS3 on the subnetwork 6.

The router advertisement sent from the router BS3 on the subnetwork 6 contains the physical network prefix (3ffe:501:100c:0006::/64) allocated to the subnetwork 6, and the virtual network prefix (3ffe:501:100c:ffff::/64) allocated for micromobility in the domain.

The mobile node (MN) creates an address according to stateless auto-configuration in which the virtual network prefix (3ffe:501:100c:ffff::/64) allocated for micromobility in the domain which is contained in the received router advertisement is placed at the upper 64 bits and the interface ID (f81:043:273:9730) of the mobile node (MN) is placed at the lower 64 bits. A virtual-network-prefix-based IPv6 address of 3ffe:501:100c:ffff:f81:043:273:9730 is thus configured.

Alternatively, the mobile node (MN) may retrieve the virtual network prefix (3ffe:501:100c:ffff::/64) stored in the router advertisement sent from the router BS3 on the subnetwork 6, and may determine that its value is equal to the network prefix portion of the virtual-network-prefix-based IPv6 address (3ffe:501:100c:ffff:f81:043:273:9730) which was configured before the mobile node (MN) moves, or when the mobile node (MN) is connected to the subnetwork 5. Thus, the mobile node (MN) may determine that the mobile node (MN) moves to a different subnetwork in the same domain to omit the address configuration process so that the same IPv6 address is continuously used by the subnetwork 6.

As shown in FIG. 25, an IPv6 link-local address, IF-f1, which is assigned to the interface on the subnetwork 6 for the router BS3 is specified as a default router of the mobile node.

The mobile node (MN) sends a routing update message in order that host routing with respect to the configured virtual-network-prefix-based IPv6 address is performed in the domain. The router which has received the routing update message generates, updates, or deletes a host entry for the mobile node (MN) which is held in the routing table by each router according to the message.

If the mobile node moves in the same domain, the IPv6 address of the mobile node does not change if the mobile node moves to a different subnetwork. Thus, if macromobility such as Mobile IPv6 (or LIN6) is implemented, it is not necessary to send a binding update packet (or a mapping update message in LIN6).

Since the IPv6 address of the mobile node which moves from one subnetwork to another in the same domain would not change, it is not necessary for a home agent (HA) or a mapping agent (MA) to update the binding cache which stores the correlation between the home address and the virtual-network-prefix-based IPv6 address. This does not require that the mobile node send a binding update packet containing the virtual-network-prefix-based IPv6 address to the home agent (HA) or the mapping agent (MA).

Hierarchical Structure of Domain

A domain having the hierarchical structure is now described according to a modification of the present invention. When a large scale of domain, e.g., a large number of subnetworks or mobile nodes which are expected to be connected, is used, the domain may be made hierarchical so that a virtual network prefix is allocated to each of the sub-domains.

Figure 26:
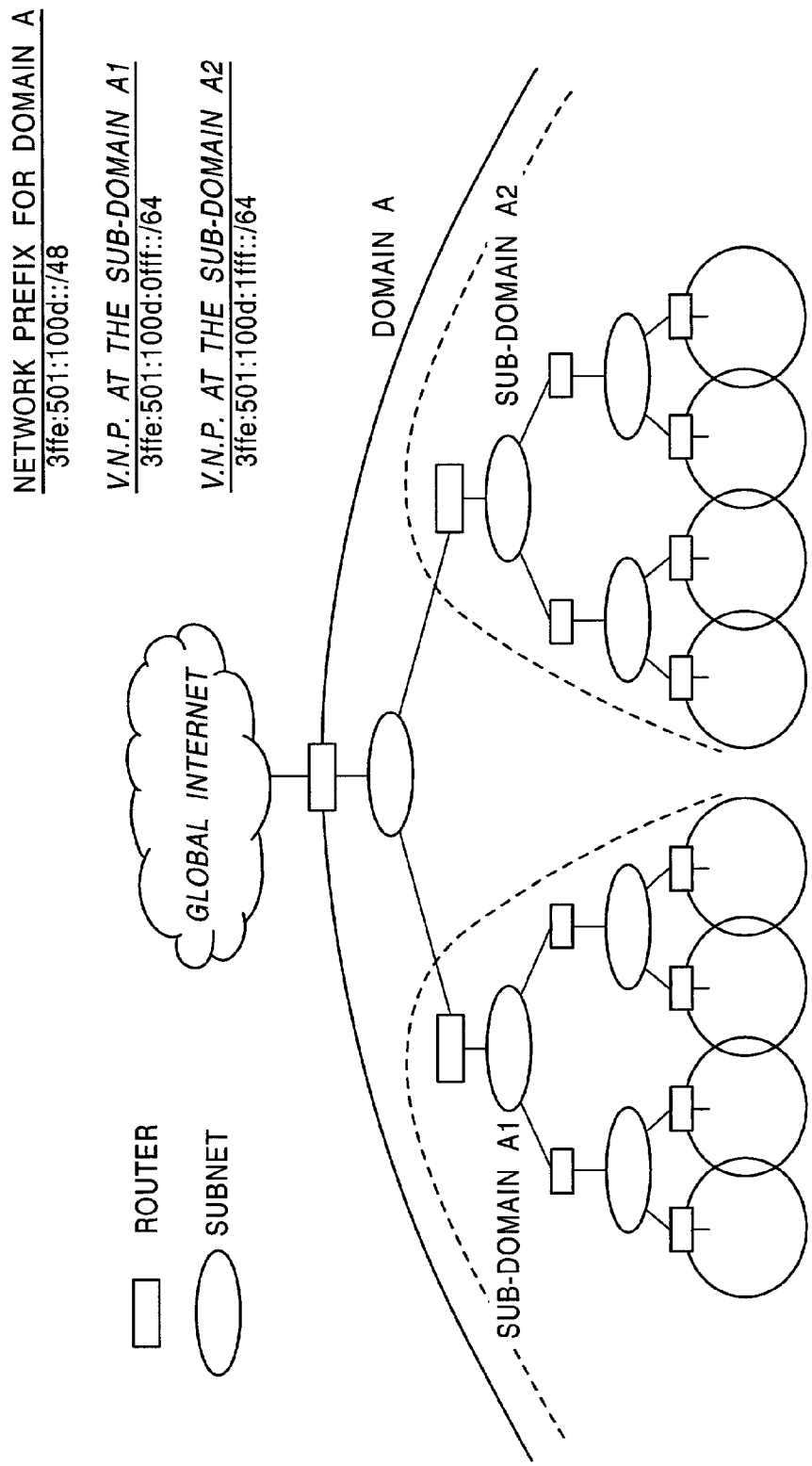
FIG. 26 is a diagram of a specific example of the hierarchical structure of a virtual-network-prefix-supported domain according to the present invention.

FIG. 26 shows that sub-domains A1 and A2 are provided in a domain A as two low-level domains. All of the domains are virtual-network-prefix-supported domains. Such a hierarchical structure of the domain allows for micromobility in sub-domains. This provides expandability in scale.

For example, as shown in FIG. 26, if the domain A to which a network prefix of 3ffe:501:100d::/64 is allocated scales up, and the number of subnetworks in the domain A or the number of mobile nodes which are expected to be connected increases, the sub-domains A1 and A2 are formed as low-level domains.

The sub-domain A1 is allocated with 3ffe:501:100d:0fff::/64 as the virtual network prefix dedicated to the sub-domain A1. The sub-domain A2 is allocated with 3ffe:501:100d:1fff::/64 as the virtual network prefix dedicated to the sub-domain A2.

Each of the routers in the sub-domain A1 sends a router advertisement, in which a physical network prefix corresponding to the subnetwork to which the mobile node is connected, and 3ffe:501:100d:0fff::/64 as a virtual network prefix are stored, to the mobile node. A virtual-network-prefix-supported mobile node connected to a subnetwork in the sub-domain A1 selects the virtual network prefix (3ffe:501:100d:0fff::/64) from the received router advertisement, and uses it together with its own interface ID to create an IPv6 address.

Each of the routers in the sub-domain A2 sends a router advertisement, in which a physical network prefix corresponding to the subnetwork to which the mobile node is connected, and 3ffe:501:100d:1fff::/64 as a virtual network prefix are stored, to the mobile node. A virtual-network-prefix-supported mobile node connected to a subnetwork in the sub-domain A2 selects the virtual network prefix (3ffe:501:100d:1fff::/64) from the received router advertisement, and uses it together with its own interface ID to create an IPv6 address.

If the mobile node moves from/to the sub-domain A1 to/from the sub-domain A2, the virtual network prefix in the router advertisement received at the sub-domain A1 or A2 at the point to which it moved is compared to the network prefix value of the upper 64 bits of the IPv6 address which was used before it moves. Since the values are different, a new IPv6 address is created using the virtual network prefix in a newly received router advertisement and its own interface ID. However, if the mobile node moves to a different subnetwork in the same domain, the virtual network prefixes used before and after it moved will be the same, and the same IPv6 address can therefore be continuously used.

Although two sub-domains A1 and A2 in the domain A are only illustrated in FIG. 26, the domain A may also include more than two sub-domains, that is, it may additionally include sub-domains A3, A4, and the like, or the domain A may use multi-layered structure where sub-domains A1a, A1b, and the like are generated at low level of the sub-domain A1 and sub-domains A2a, A2b, and the like are generated at lower level of the sub-domain A2.

The present invention has been described in detail in conjunction with its specific embodiments. However, it will be anticipated that various change or modification may be made to these embodiments by a person having ordinary skill in the art without departing from the spirit and scope of the invention. In other words, the present invention is disclosed as is only illustrative, and is not intended to be interpreted as its limiting form. The spirit and scope of the present invention should be understood after reviewing the appended claims.

A process sequence described herein can be implemented in hardware or software, or a combination thereof. If the process sequence is implemented in software, a program describing the process sequence may be executed after installed on a memory of a computer which is incorporated in dedicated hardware, or the program may be executed after installed on a general-purpose computer which allows various processing.

For example, the program may be pre-recorded in a hard disk or a ROM (read-only memory) as a recording medium. Alternatively, the program may be temporarily or persistently stored or recorded in a removable recording medium such as a floppy disk, a CD-ROM (compact disc read-only memory), an MO (magneto optical) disk, a DVD (digital versatile disc), a magnetic disk, or a semiconductor memory. Such a removable recording medium may be used for so-called packaged software.

Instead of installation on a computer from such a removable recording medium, the program may be transferred by wireless communications from a download site to a computer, or transferred by wired communications to a computer over a network such as the Internet. A computer may receive the program which is transferred in this way, and install it on a recording medium such as an internal hard disk.

Various process steps described herein may be performed in a time-series manner according to the description, and may also be performed in parallel or independently depending upon the processing capability of a processing apparatus or depending upon necessity. As used herein, terminology "system" means a logical assemblage comprising a plurality of apparatuses, and is not limited on the system incorporating the apparatuses into the same housing or casing.

According to the present invention, therefore, a virtual network prefix is used as a prefix dedicated to a mobile node, thereby supporting micromobility.

Furthermore, according to the present invention, if a virtual-network-prefix-unsupported mobile node which cannot identify a virtual network prefix is connected to a virtual-network-prefix-supported domain, the mobile node uses a physical network prefix in a usual way to communicate according to IPv6. Therefore, nodes which can and cannot identify a virtual network prefix can coexist in a domain.

Furthermore, according to the present invention, it is not necessary to modify the header of a data packet in between in order to support micromobility. This increases security, for example, for end-to-end communications.

What is claimed is:

1. A communication processing system comprising a mobile node which is a mobile communication terminal device, said system configured such that:

in a domain including at least one subnetwork, each subnetwork being associated with a physical network prefix, a virtual network prefix for the mobile node is determined as a network prefix that is different from the physical network prefix, an address is configured based on the virtual network prefix and an identifier of the mobile node, the communications process with the mobile node is performed according to the address, and a router in the domain routes a packet by performing host-based routing based on the identifier of the mobile node;

wherein, when the mobile node moves between a first subnetwork to a second subnetwork in the domain or in different domains, the mobile node compares the value of the virtual network prefix which is contained in the router advertisement with the value of the virtual or physical network prefix which is contained in the address which is used in the first subnetwork; and only if the values are different, the mobile node creates an address based on the virtual network prefix which is contained in the received router advertisement serving as an information notification message.

2. A communication processing system according to claim 1, wherein the identifier of the mobile node is a unique identifier in the domain for identifying the mobile node.

3. A communication processing system according to claim 1, wherein the identifier of the mobile node is a unique interface ID in the domain for identifying the mobile node.

4. A communication processing system according to claim 1, wherein a router in the domain forwards a router advertisement as an information notification message containing information on the physical network prefix and the virtual network prefix.

5. A communication processing system according to claim 1, wherein the router routes a packet having the address which contains the virtual network prefix by performing the host-based routing.

6. A communication processing system according to claim 1, wherein the router routes a packet having an address which contains a physical network prefix by performing prefix-based routing based on the physical network prefix contained in the address, or by performing the host-based routing.

7. A communication processing system according to claim 1, wherein, when the mobile node moves between subnetworks in the domain or in different domains, the mobile node sends a routing update message to a router in the domain; and the router which has received the routing update message generates, updates, or deletes an entry for the mobile node in a routing table according to the received message.

8. A communication processing system according to claim 1, wherein a plurality of domains are networked in a hierarchical manner, each domain including the at least one subnetwork.

9. A communication processing system comprising a mobile node which is a mobile communication terminal device, said system configured such that:

in a domain including at least one subnetwork, each subnetwork being associated with a physical network prefix, a virtual network prefix for the mobile node is determined as a network prefix that is different from the physical network prefix, an address is configured based on the virtual network prefix and an identifier of the mobile node, the communications process with the mobile node is performed according to the address, when the mobile node moves between subnetworks in different domains, the mobile node stores a virtual-network-prefix-based IPv6 address as a care-of address in a binding update packet, the virtual-network-prefix-based IPv6 address being created according to address configuration based on the virtual network prefix, and sends the binding update packet to a home agent which manages the mobile node, and the home agent which has received the binding update packet updates a binding cache, in which the correlation between a home address and the virtual-network-prefix-based IPv6 address as a care-of address is stored, according to the received binding update packets, wherein, when the mobile node moves between a first subnetwork to a second subnetwork in the domain or in different domains, the mobile node compares the value of the virtual network prefix which is contained in the router advertisement with the value of the virtual or physical network prefix which is contained in the address which is used in the first subnetwork; and only if the values are different, the mobile node creates an address based on the virtual network prefix which is contained in the received router advertisement serving as an information notification message.

10. A communication processing method comprising the steps of:

in a domain including at least one subnetwork, associating each subnetwork with a physical network prefix, determining a virtual network prefix for a mobile node that is a mobile communication terminal device as a network prefix that is different from the physical network prefix;

configuring an address based on the virtual network prefix and an identifier of the mobile node; and performing communications with the mobile node according to the address, wherein, a router in the domain routes a packet by performing host-based routing based on the identifier of the mobile node;

when the mobile node moves between a first subnetwork to a second subnetwork in the domain or in different domains, the mobile node compares the value of the virtual network prefix which is contained in the router advertisement with the value of the virtual or physical network prefix which is contained in the address which is used in the first subnetwork; and only if the values are different, the mobile node creates an address based on the virtual network prefix which is contained in the received router advertisement serving as an information notification message.

11. A communication processing method according to claim 10, wherein the identifier of the mobile node is a unique identifier in the domain for identifying the mobile node.

12. A communication processing method according to claim 10, wherein the identifier of the mobile node is a unique interface ID in the domain for identifying the mobile node.

13. A communication processing method according to claim 10, wherein a router in the domain forwards a router advertisement as an information notification message containing information on the physical network prefix and the virtual network prefix.

14. A communication processing method according to claim 10, wherein the router routes a packet having the address which contains the virtual network prefix by performing the host-based routing.

15. A communication processing method according to claim 10, wherein the router routes a packet having an address which contains a physical network prefix by performing prefix-based routing based on the physical network prefix contained in the address, or by performing the host-based routing.

16. A communication processing method according to claim 10, wherein,
when the mobile node moves between subnetworks in the domain or in different domains, the mobile node sends a routing update message to a router in the domain; and
the router which has received the routing update message generates, updates, or deletes an entry for the mobile node in a routing table according to the received message.

17. A communication processing method comprising the steps of:
in a domain including at least one subnetwork, associating each subnetwork with a physical network prefix,
determining a virtual network prefix for a mobile node that is a mobile communication terminal device as a network prefix that is different from the physical network prefix;
configuring an address based on the virtual network prefix and an identifier of the mobile node; and
performing communications with the mobile node according to the address,
wherein,
when the mobile node moves between subnetworks in different domains, the mobile node stores a virtual-network-prefix-based IPv6 address as a care-of address in a binding update packet, the virtual-network-prefix-based IPv6 address being created according to address configuration based on the virtual network prefix, and sends the binding update packet to a home agent which manages the mobile node,
the home agent which has received the binding update packet updates a binding cache, in which the correlation between a home address and the virtual-network-prefix-based IPv6 address is stored, according to the received binding update packet,
when the mobile node moves between a first subnetwork to a second subnetwork in the domain or in different domains, the mobile node compares the value of the virtual network prefix which is contained in the router advertisement with the value of the virtual or physical network prefix which is contained in the address which is used in the first subnetwork; and
only if the values are different, the mobile node creates an address based on the virtual network prefix which is contained in the received router advertisement serving as an information notification message.

18. A communication terminal device performing a communications method via a network, comprising:
receiving a router advertisement serving as an information notification message containing a physical network prefix and a virtual network prefix for a mobile node, the physical network prefix being allocated to each of at least one subnetwork included in a domain; and
configuring an address based on the virtual network prefix retrieved from the received router advertisement serving as an information notification message and an identifier of the communication terminal device,
wherein,
when the mobile node moves from a first subnetwork to a second subnetwork in the domain or in different domains, the mobile node creates an address based on information that is contained in a router advertisement serving as an information notification message that is received from a router on the second subnetwork,
when the mobile node moves between a first subnetwork to a second subnetwork in the domain or in different domains, the mobile node compares the value of the virtual network prefix which is contained in the router advertisement with the value of the virtual or physical network prefix which is contained in the address which is used in the first subnetwork; and
only if the values are different, the mobile node creates an address based on the virtual network prefix which is contained in the received router advertisement serving as an information notification message.

19. A communication terminal device according to claim 18, wherein, when the communication terminal device moves from a first subnetwork to a second subnetwork in the domain or in different domains, the communication terminal device compares the value of the virtual network prefix which is contained in the router advertisement with the value of the virtual or physical network prefix which is contained in the address which is used in the first subnetwork; and
only if the values are different, the communication terminal device creates an address based on the virtual or physical network prefix which is contained in the received router advertisement serving as an information notification message.

20. A communication terminal device according to claim 18, wherein, when the communication terminal device moves from a first subnetwork to a second subnetwork in the domain or in different domains, if the virtual network prefix is not contained in the router advertisement, the communication terminal device creates an address based on the physical network prefix.

21. A communication terminal device according to claim 18, wherein, when the communication terminal device moves between subnetworks in the domain or in different domains, the communication terminal device sends a routing update message to a router in the domain.

22. A communication terminal device according to claim 18, wherein, when the communication terminal device moves between subnetworks in different domains, the communication terminal device stores a virtual-network-prefix-based IPv6 address as a care-of address in a binding update packet, the virtual-network-prefix-based IPv6 address being created according to address configuration based on the virtual network prefix, and sends the binding update packet to a home agent which manages the communication terminal device.

23. A program stored on a computer-readable medium which causes a communications process via a network to be executed on a computer system, said program implementing the steps of:
receiving a router advertisement serving as an information notification message containing a physical network prefix and a virtual network prefix for a mobile node, the physical network prefix being allocated to each of at least one subnetwork included in a domain; and
configuring an address based on the virtual network prefix retrieved from the received router advertisement serving as an information notification message and an identifier of a communication terminal device;
wherein, when the mobile node moves from a first subnetwork to a second subnetwork in the domain or in different domains, the mobile node creates an address based on information that is contained in a router advertisement serving as an information notification message that is received from a router on the second subnetwork;

when the mobile node moves between a first subnetwork to a second subnetwork in the domain or in different domains, the mobile node compares the value of the virtual network prefix which is contained in the router advertisement with the value of the virtual or physical network prefix which is contained in the address which is used in the first subnetwork; and only if the values are different, the mobile node creates an address based on the virtual network prefix which is contained in the received router advertisement serving as an information notification message.

24. A communication processing system comprising a mobile node which is a mobile communication terminal device, said system configured such that:

in a domain including at least one subnetwork, each subnetwork being associated with a physical network prefix, a virtual network prefix for the mobile node is determined as a network prefix that is different from the physical network prefix, an address is configured based on the virtual network prefix and an identifier of the mobile node, the communications process with the mobile node is performed according to the address, and when the mobile node moves from a first subnetwork to a second subnetwork in the domain or in different domains, the mobile node creates an address based on information that is contained in a router advertisement serving as an information notification message that is received from a router on the second subnetwork;

wherein, when the mobile node moves between a first subnetwork to a second subnetwork in the domain or in different domains, the mobile node compares the value of the virtual network prefix which is contained in the router advertisement with the value of the virtual or physical network prefix which is contained in the address which is used in the first subnetwork; and only if the values are different, the mobile node creates an address based on the virtual network prefix which is contained in the received router advertisement serving as an information notification message.

25. A communication processing system according to claim 24, wherein, when the mobile node moves from a first subnetwork to a second subnetwork in the domain or in different domains, if the virtual network prefix is not contained in the router advertisement, the mobile node creates an address based on the physical network prefix.

26. A communication processing method comprising the steps of:

in a domain including at least one subnetwork, associating each subnetwork with a physical network prefix;

determining a virtual network prefix for a mobile node that is a mobile communication terminal device as a network prefix that is different from the physical network prefix;

configuring an address based on the virtual network prefix and an identifier of the mobile node; and performing communications with the mobile node according to the address;

wherein, when the mobile node moves from a first subnetwork to a second subnetwork in the domain or in different domains, the mobile node creates an address based on information that is contained in a router advertisement serving as an information notification message that is received from a router on the second subnetwork;

when the mobile node moves between a first subnetwork to a second subnetwork in the domain or in different domains, the mobile node compares the value of the virtual network prefix which is contained in the router advertisement with the value of the virtual or physical network prefix which is contained in the address which is used in the first subnetwork; and only if the values are different, the mobile node creates an address based on the virtual network prefix which is contained in the received router advertisement serving as an information notification message.

27. A communication processing method according to claim 26, wherein, when the mobile node moves between a first subnetwork to a second subnetwork in the domain or in different domains, if the virtual network prefix is not contained in the router advertisement, the mobile node creates an address based on the physical network prefix.

* * * * *